US012541045B2

(12) United States Patent
Sun et al.

(10) Patent No.: US 12,541,045 B2
(45) Date of Patent: Feb. 3, 2026

(54) ABSORBER AND METHOD OF FORMING THE SAME

(71) Applicant: Agency for Science, Technology and Research, Singapore (SG)

(72) Inventors: Conglin Sun, Singapore (SG); Chong Pei Ho, Singapore (SG); Lennon Yao Ting Lee, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 355 days.

(21) Appl. No.: 18/279,024

(22) PCT Filed: Mar. 4, 2021

(86) PCT No.: PCT/SG2021/050112
§ 371 (c)(1),
(2) Date: Aug. 25, 2023

(87) PCT Pub. No.: WO2022/186764
PCT Pub. Date: Sep. 9, 2022

(65) Prior Publication Data
US 2024/0142679 A1 May 2, 2024

(51) Int. Cl.
*G02B 5/20* (2006.01)
*G02B 1/00* (2006.01)

(52) U.S. Cl.
CPC ............. *G02B 5/208* (2013.01); *G02B 1/002* (2013.01); *G02B 5/207* (2013.01)

(58) Field of Classification Search
CPC .......... G02B 5/208; G02B 5/20; G02B 5/201; G02B 5/207; G02B 5/22; G02B 1/002;
(Continued)

(56) References Cited

U.S. PATENT DOCUMENTS

2017/0317221 A1 11/2017 Usami
2019/0296682 A1 9/2019 Swillam et al.

FOREIGN PATENT DOCUMENTS

CN 104198051 A 12/2014
CN 204289720 U 4/2015
(Continued)

OTHER PUBLICATIONS

Magdi et al., Broadband MIR harvester using silicon nanostructures, Scientific Reports, published Apr. 9, 2019 (Year: 2019).*
(Continued)

*Primary Examiner* — Stephone B Allen
*Assistant Examiner* — Adam W Booher
(74) *Attorney, Agent, or Firm* — Shackelford, McKinley & Norton, LLP

(57) ABSTRACT

An absorber and a method of forming an absorber. The absorber may include a semiconductor absorption structure doped with dopants of a first conductivity type. The absorber may also include a semiconductor substrate doped with dopants of a second conductivity type different from the first conductivity type. The absorber may further include a dielectric layer between the semiconductor absorption structure and the semiconductor substrate. The absorber may additionally include a buried semiconductor structure included in a cavity of the dielectric layer, the buried semiconductor structure doped with dopants of the first conductivity type.

20 Claims, 22 Drawing Sheets

(58) Field of Classification Search
CPC . G02B 2207/101; H10F 30/221; H10F 30/21; H10F 30/22; H10F 77/147; H10F 77/413; H10F 77/14; H10F 77/40; H01Q 17/00; B82Y 20/00

See application file for complete search history.

(56) References Cited

FOREIGN PATENT DOCUMENTS

| | | |
|---|---|---|
| CN | 103346409 B | 6/2016 |
| CN | 109799556 A | 5/2019 |

OTHER PUBLICATIONS

International Search Report for International Application No. PCT/SG2021/050112 dated Jun. 15, 2021, pp. 1-3.

Gorgulu et al., "All-Silicon Ultra-Broadband Infrared Light Absorbers," Scientific Reports, vol. 6, No. 38589, Dec. 7, 2016, pp. 1-7.

Written Opinion of the International Searching Authority for International Application No. PCT/SG2021/050112 dated Jun. 15, 2021, pp. 1-4.

Rabiee-Golgir et al., "Ultra-Thin Super Absorbing Photon Trapping Materials for High-Performance Infrared Detection," Proceedings of SPIE, vol. 11002, May 7, 2019, pp. 1-7.

Gao et al., "Refractory Ultra-Broadband Perfect Absorber from Visible to Near-Infrared," Nanomaterials, vol. 8, No. 12, 2018, pp. 1-11.

* cited by examiner

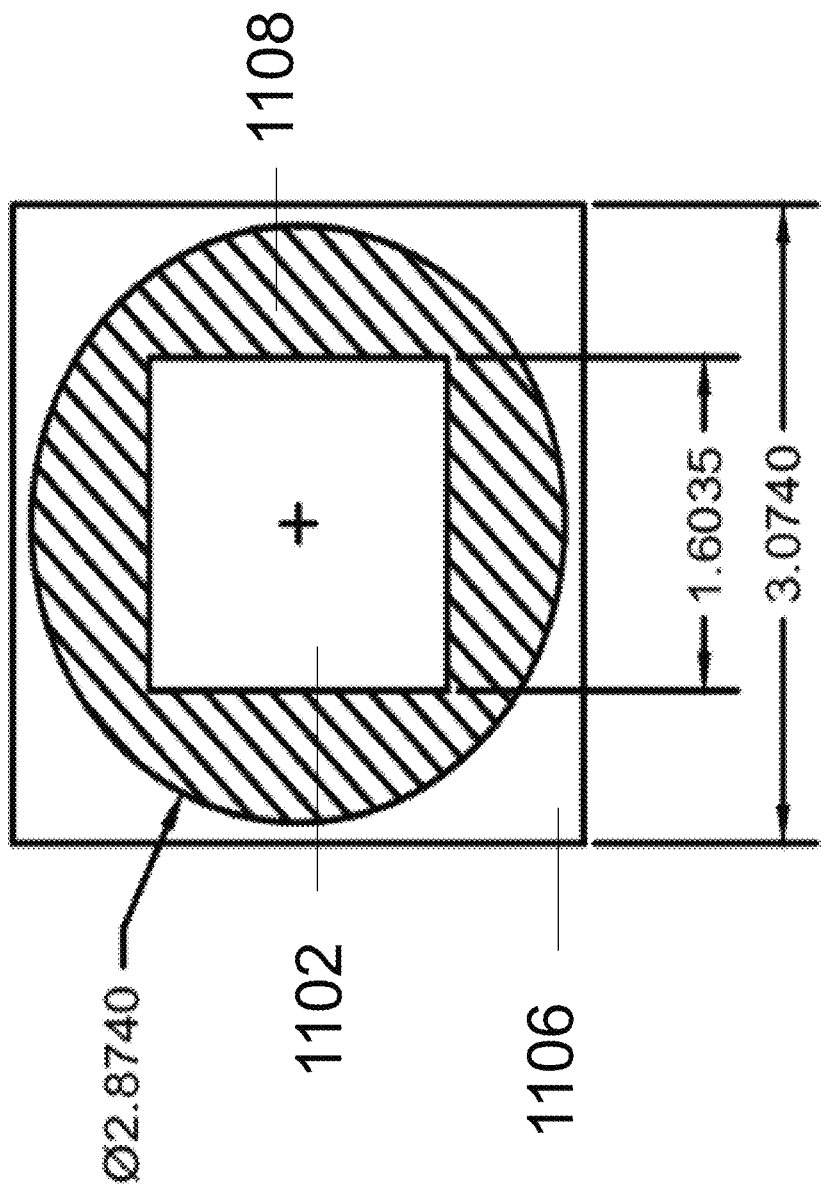

ABSORBER AND METHOD OF FORMING THE SAME

TECHNICAL FIELD

Various embodiments of this disclosure may relate to an absorber. Various embodiments of this disclosure relate may relate to a method of forming an absorber.

BACKGROUND

The artificial electromagnetic metamaterial is an artificial medium that does not exist in nature. It uses subwavelength microstructures as the primary unit cell of materials. Due to unique electromagnetic properties, such as the negative refractive index effect, negative permeability effects, strong circular dichroism, electromagnetic stealth, inverse Doppler Effect, inverse Cherenkov Radiation, and amplified evanescent waves, absorbing artificial electromagnetic metamaterials have attracted widespread attention. Research on absorbing artificial electromagnetic metamaterials has achieved excellent results in recent years. However, there are still many critical technical problems to be solved, such as wide working frequency band of absorbing artificial electromagnetic metamaterials with high absorption coefficients.

The periodic perfectly absorbing structure is an emerging type of electromagnetic structural device derived in recent years from electromagnetic metamaterials. This absorbing structure uses resonance characteristics of metamaterials. Through reasonable modulation of electrical and magnetic resonances, the structure can be matched with the impedance of space, so that the reflection of incident electromagnetic waves at the resonance point is zero. The transmission of the incident wave, therefore, can form an absorption peak with an almost 100% absorption effect. This absorbing structure has many advantages, such as high absorption efficiency, adjustable electromagnetic resonance characteristics, and insensitivity to the incident angle and the polarization direction. However, because this absorption effect is based on the electromagnetic resonance characteristics of a periodic perfect absorbing structure, it has inherent disadvantages such as a narrow absorption band and a single frequency band. However, in many fields of application, such as thermal radiation modulators, multi-spectral dot-matrix imaging, infrared thermal radiation detection camouflage, a periodic perfect absorbing structure with multi-band or wide-band absorption effects is urgently needed.

A mid-infrared multi-band and wide-band periodic absorbing structure based on media modulation has been previously proposed in 2013. This structure uses a cylindrical structure as the basic unit, formed by stacking electrolyte materials with different dielectric constants as well as aluminum (Al). The structure uses aluminum (Al) thin film and silicon (Si) as the substrate to achieve in a large bandwidth in the range of 5.5-7.0 μm of up to 80% absorption. However, as the structure uses too many kinds of materials and the number of layers of the basic unit is too large, the structure is costly and challenging to process.

A metamaterial absorber with a symmetrical L-shaped metal strip has also been proposed in 2014. The structure may include only four layers: a substrate layer, a metal layer, a dielectric layer, and an L-shaped structure layer. However, the absorber only achieved three absorption peaks in the frequency band of about 5-10 μm, and the absorption rate was weak in the remaining frequency bands.

A multi-layer structure formed by stacking doped silicon and undoped silicon has been proposed in 2019, but the structure has been able to achieve high absorption only from 4-7 μm and with high dependence on the incident angle.

SUMMARY

Various embodiments may relate to an absorber. The absorber may include a semiconductor absorption structure doped with dopants of a first conductivity type. The absorber may also include a semiconductor substrate doped with dopants of a second conductivity type different from the first conductivity type. The absorber may further include a dielectric layer between the semiconductor absorption structure and the semiconductor substrate. The absorber may additionally include a buried semiconductor structure included in a cavity of the dielectric layer, the buried semiconductor structure doped with dopants of the first conductivity type.

Various embodiments may relate to a method of forming an absorber. The method may include forming a semiconductor absorption structure doped with dopants of a first conductivity type. The method may also include forming a semiconductor substrate doped with dopants of a second conductivity type different from the first conductivity type. The method may further include forming a dielectric layer between the semiconductor absorption structure and the semiconductor substrate. The method may additionally include forming a buried semiconductor structure included in a cavity of the dielectric layer, the buried semiconductor structure doped with dopants of the first conductivity type.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 11C is a schematic showing a top view of the absorber shown in FIG. 11A according to various embodiments.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or absorbers are analogously valid for the other methods or absorbers. Similarly, embodiments described in the context of a method are analogously valid for an absorber, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The resonator as described herein may be operable in various orientations, and thus it should be understood that the terms "top", "bottom", etc., when used in the following description are used for convenience and to aid understanding of relative positions or directions, and not intended to limit the orientation of the absorber.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1:
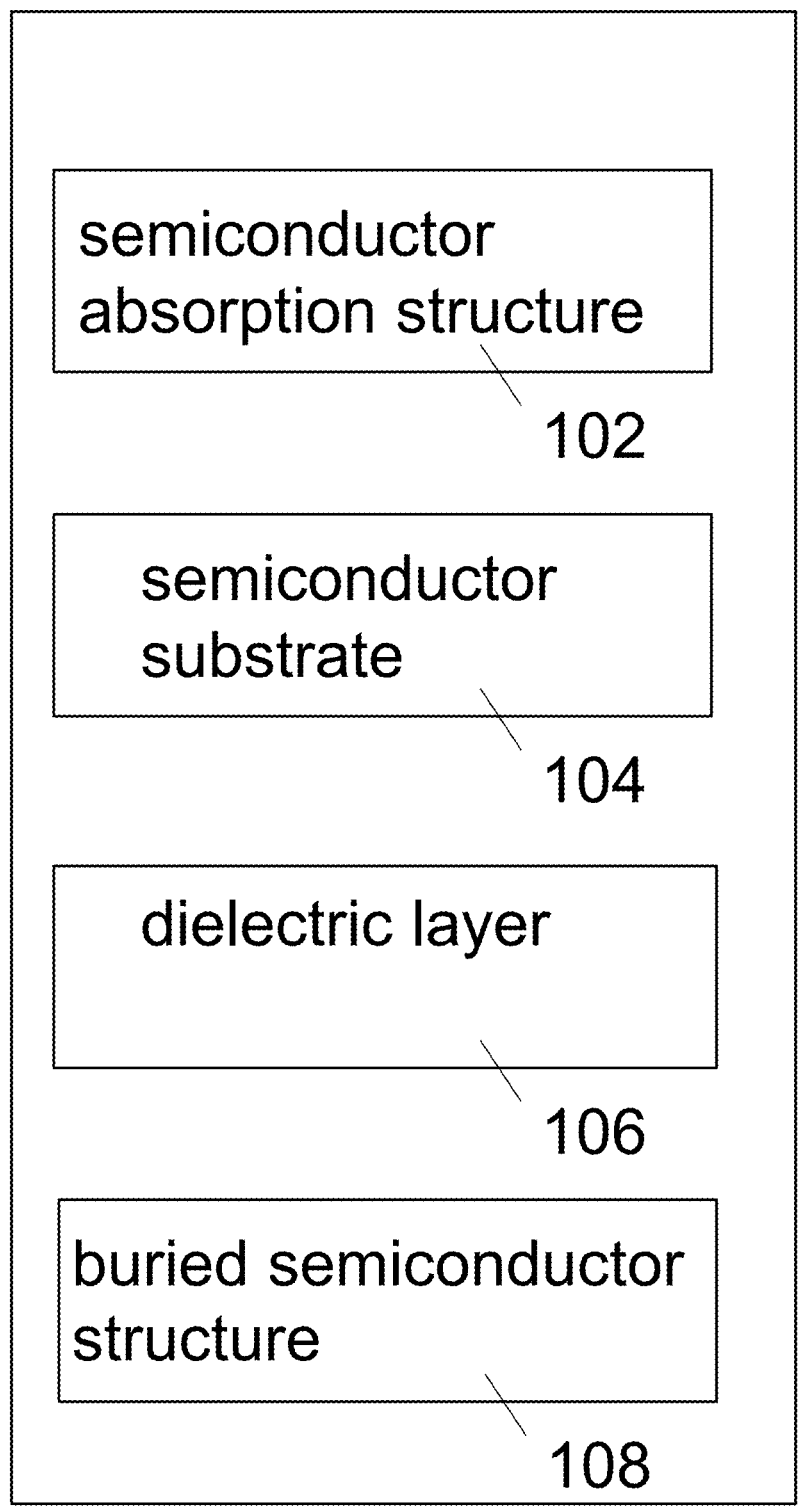
FIG. 1 is a general illustration of an absorber according to various embodiments.

FIG. 1 is a general illustration of an absorber according to various embodiments. The absorber may include a semiconductor absorption structure 102 doped with dopants of a first conductivity type. The absorber may also include a semiconductor substrate 104 doped with dopants of a second conductivity type different from the first conductivity type. The absorber may further include a dielectric layer 106 between the semiconductor absorption structure 102 and the semiconductor substrate 104. The absorber may additionally include a buried semiconductor structure 108 included in a cavity of the dielectric layer, the buried semiconductor structure 108 doped with dopants of the first conductivity type.

In other words, the absorber may include a semiconductor absorption structure 102, a semiconductor substrate 104, and a dielectric layer 106 between the semiconductor absorption structure 102 and the semiconductor substrate 104. The absorber may also include a buried semiconductor structure 108 embedded in the dielectric layer 108. The semiconductor absorption structure 102 and the buried semiconductor structure 108 may be doped with dopants of a first conductivity type, while the semiconductor substrate 104 may be doped with dopants of a second conductivity type opposite the first conductivity type.

For avoidance of doubt, FIG. 1 illustrates some of the features of an absorber according to various embodiments, and does not limit, for instance, the size, shape, arrangement, orientation etc. of these features.

In various embodiments, the buried semiconductor structure 108 may extend from the semiconductor absorption structure 102. The buried semiconductor structure 108 may be in contact with the semiconductor absorption structure 102. In various embodiments, the buried semiconductor structure 108 and the semiconductor absorption structure 102 may be parts of a single monolithic structure.

The buried semiconductor structure 108 may be referred to as a buried layer. The semiconductor absorption structure 102 may be referred to as a top layer. The semiconductor substrate 104 may be referred to as a bottom layer. The dielectric layer 106 may be referred to as a middle layer.

In various embodiments, the first conductivity type may be n-type and the second conductivity type may be p-type. In various other embodiments, the first conductivity type may be p-type and the second conductivity type may be n-type. Embodiments in which the semiconductor absorption structure 102 and the buried semiconductor structure 108 are n-doped and the semiconductor substrate 104 is p-doped may show higher absorption, compared to embodiments in which the semiconductor absorption structure 102 and the buried semiconductor structure 108 are p-doped and the semiconductor substrate 104 is n-doped.

According to the Lorentz-Drude Model, the doping concentration may change the dielectric constant. By designing the real and imaginary component of the dielectric constant and optimizing the structure, high absorption may be achieved.

In various embodiments, the semiconductor absorption structure 102, the semiconductor substrate 104, and the buried semiconductor structure 108 may include silicon. The dielectric layer 106 may include silicon oxide. In various other embodiments, the semiconductor absorption structure 102, the semiconductor substrate 104, and the buried semiconductor structure 108 may include an alternative semiconductor material such as germanium or any other suitable semiconductor material. The dielectric layer 106 may include an alternative dielectric material such as silicon nitride, hafnium oxide, and any other suitable dielectric material.

In various embodiments, the semiconductor absorption structure 102 may be a cuboid. The buried semiconductor structure 108 may be a cylinder having a circular surface at one end. In various embodiments, the circular surface may have a radius selected from a range from 0.7 μm to 1.2 μm. In various embodiments, a thickness of the cylinder may be selected from a range from 0.6 μm to 0.8 μm.

In various embodiments, the semiconductor absorption structure 102 may be patterned. The semiconductor absorption structure 102 may be patterned such that the semiconductor absorption structure defines a periodic array. The periodic array may be defined on a top surface of the semiconductor absorption structure 102.

In various embodiments, the semiconductor absorption structure may have a doping concentration selected from a range from $10^{19}$ cm$^{-3}$ to $5\times10^{19}$ cm$^{-3}$.

In various embodiments, the absorber may be a mid-infrared absorber. The absorber may be configured to absorb more than 80% of the incident light, which may be selected from a range from 3.0 μm to 12.0 μm. In various embodiments, the absorber may be configured to absorb more than 60% of the light having an angle of incidence selected from a range from 0 degree to 70 degrees.

Figure 2:
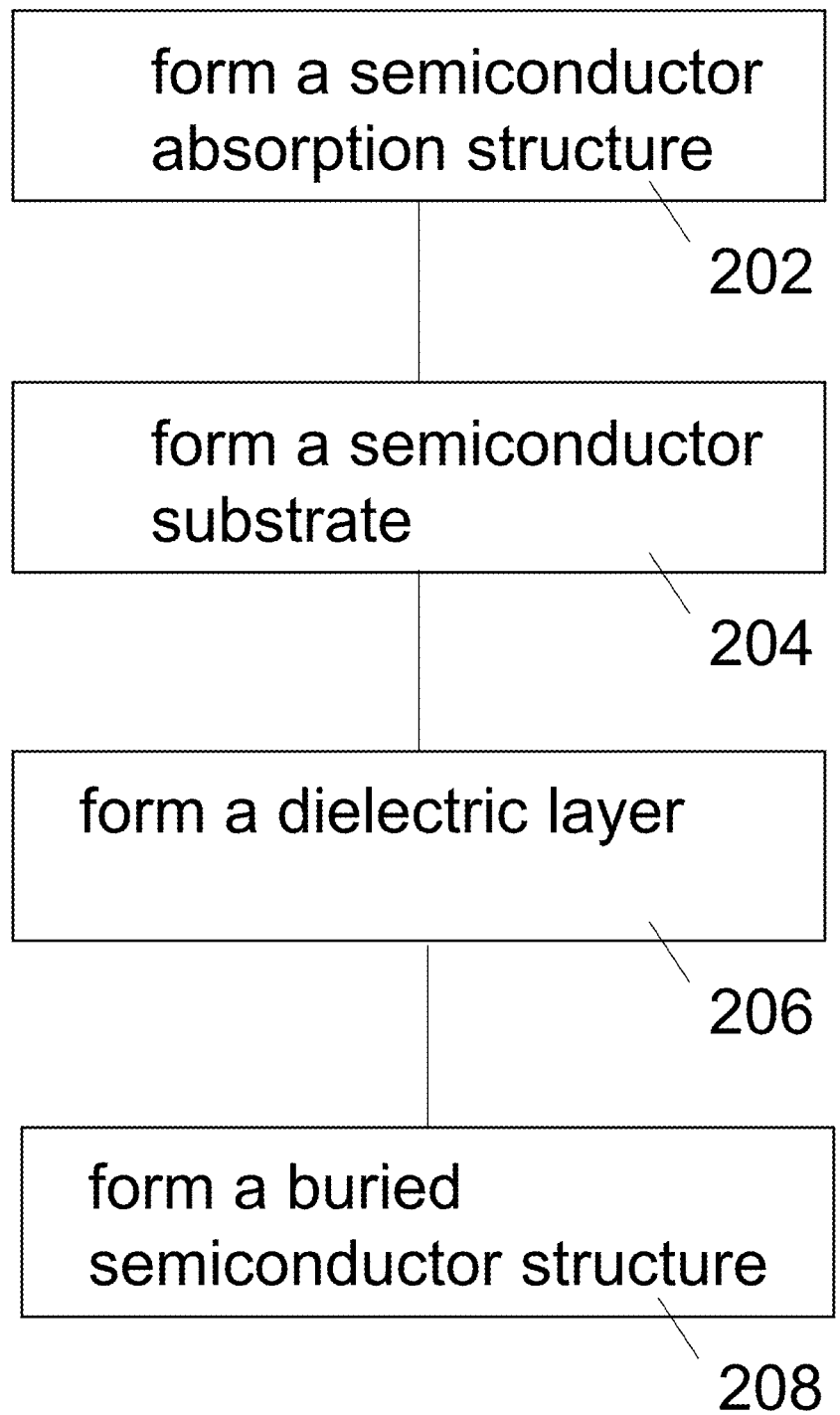
FIG. 2 is a general illustration of a method of forming an absorber according to various embodiments.

FIG. 2 is a general illustration of a method of forming an absorber according to various embodiments. The method may include, in 202, forming a semiconductor absorption structure doped with dopants of a first conductivity type. The method may also include, in 204, forming a semiconductor substrate doped with dopants of a second conductivity type different from the first conductivity type. The method may further include, in 206, forming a dielectric layer between the semiconductor absorption structure and the semiconductor substrate. The method may additionally include, in 208, forming a buried semiconductor structure included in a cavity of the dielectric layer, the buried semiconductor structure doped with dopants of the first conductivity type.

In other words, the method may include doping the semiconductor absorption structure and the buried semiconductor structure with dopants of a first conductivity type, and doping a semiconductor substrate with dopants of a second conductivity type opposite the first. A dielectric layer may be formed between the semiconductor absorption structure and the semiconductor substrate.

For avoidance of doubt, the various steps highlighted in FIG. 2 may not be in sequence. For instance, in various embodiments, step 202 may occur at the same time or after steps 204, 206 and 208.

In various embodiments, the buried semiconductor structure may extend from the semiconductor absorption structure.

In various embodiments, the first conductivity type may be n-type and the second conductivity type may be p-type. In various other embodiments, the first conductivity type may be p-type and the second conductivity type may be n-type.

In various embodiments, the semiconductor absorption structure, the semiconductor substrate, and the buried semiconductor structure may include silicon. The dielectric layer may include silicon oxide. In various other embodiments, the semiconductor absorption structure, the semiconductor substrate, and the buried semiconductor structure may include an alternative semiconductor material such as germanium or any other suitable semiconductor material. The dielectric layer may include an alternative dielectric material such as silicon nitride, hafnium oxide, and any other suitable dielectric material.

In various embodiments, the semiconductor absorption structure may be a cuboid. The buried semiconductor structure may be a cylinder having a circular surface at one end. In various embodiments, the circular surface may have a radius selected from a range from 0.7 μm to 1.2 μm. In various embodiments, a thickness of the cylinder may be selected from a range from 0.6 μm to 0.8 μm.

In various embodiments, the semiconductor absorption structure may be patterned. The semiconductor absorption structure may be patterned such that the semiconductor absorption structure defines a periodic array. The periodic array may be defined on a top surface of the semiconductor absorption structure.

In various embodiments, the semiconductor absorption structure may have a doping concentration selected from a range from $10^{19}$ cm$^{-3}$ to $5\times10^{19}$ cm$^{-3}$.

Figure 3:
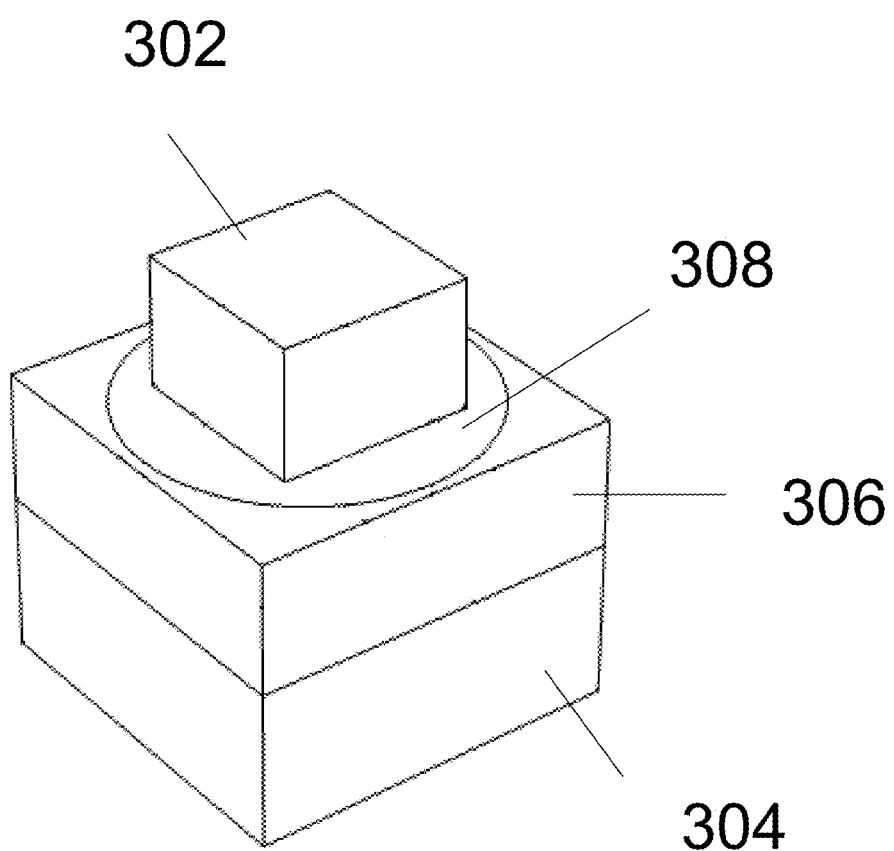
FIG. 3 is a schematic showing a perspective view of an absorber according to various embodiments.

FIG. 3 is a schematic showing a perspective view of an absorber according to various embodiments. The structure shown in FIG. 3 may be an unit cell. The absorber may include a semiconductor absorption structure 302 doped with dopants of a first conductivity type. For instance, the semiconductor absorption structure 302 may include n-type silicon (Si). The absorber may also include a semiconductor substrate 304 doped with dopants of a second conductivity type different from the first conductivity type. The substrate 304 may include p-type silicon (Si) The absorber may further include a dielectric layer 306, including a dielectric such as silicon oxide (SiO$_2$), between the semiconductor absorption structure 302 and the semiconductor substrate 304. The absorber may additionally include a buried semiconductor structure 308 included in a cavity of the dielectric layer, the buried semiconductor structure 308 doped with dopants of the first conductivity type. For instance, the buried semiconductor structure 308 may include n-type silicon (Si).

In addition to the free charge absorption generated by doped Si, this structure may introduce surface plasmon and gap-plasmon modes through the periodic structure formed by the top layer (i.e. semiconductor absorption structure 302) and the buried layer (i.e. buried semiconductor structure 308) to improve the absorption rate in the mid-infrared band. Various embodiments may realize an absorption rate higher than 80% in the range of an ultra-wide bandwidth of 3 µm to 12 µm. Meanwhile, the structure may not be sensitive to the incident angle. When the incident angle is 70 degree, the absorption rate may still be higher than 60%. The three-layer pure Si structure may significantly simplify the steps required for fabrication and may be compatible with complementary metal oxide semiconductor (CMOS) technology, which can significantly reduce costs.

Figure 4A:
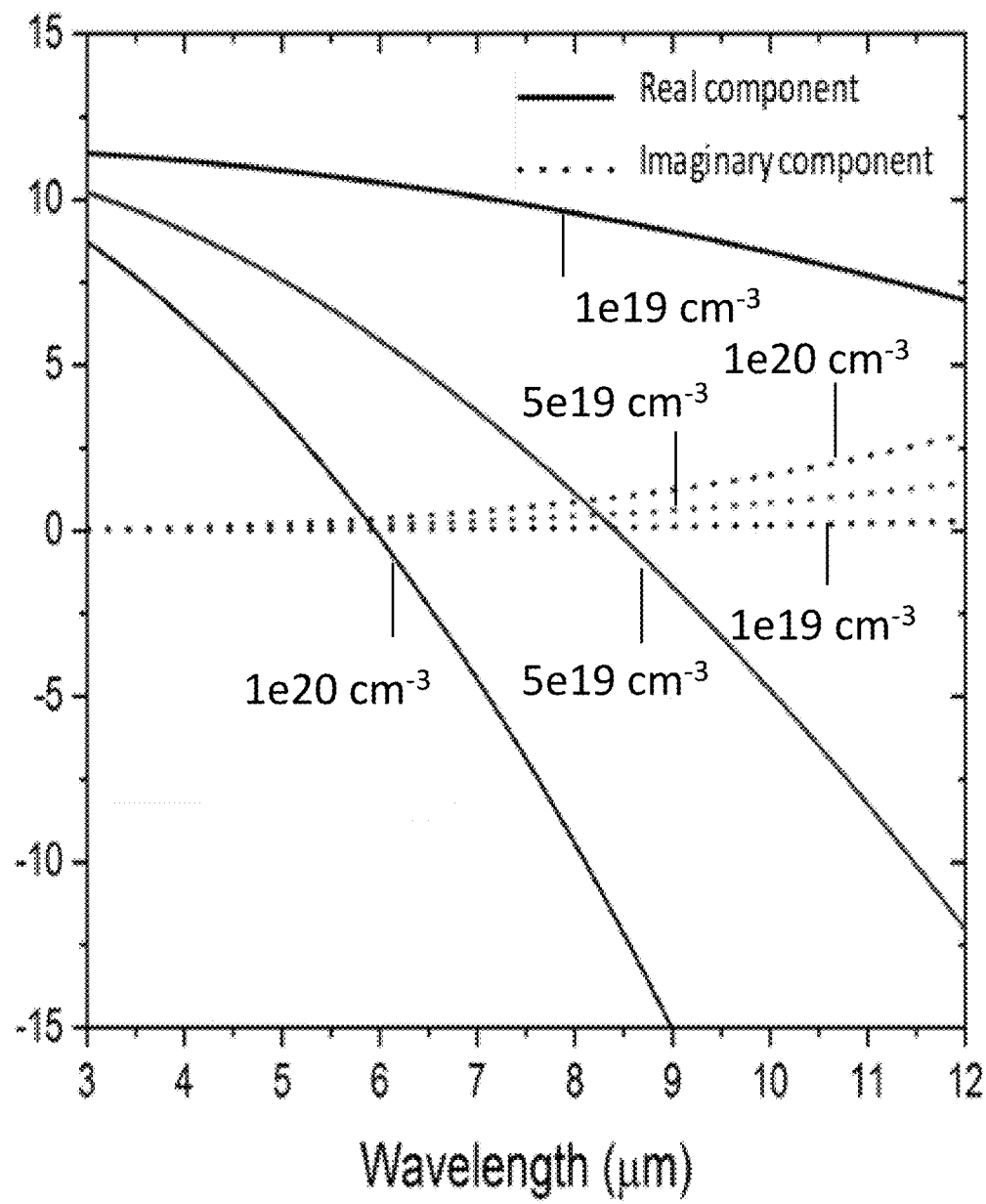
FIG. 4A is a plot of permittivity as a function of wavelength (in micrometers or μm) showing the effect of doping concentration has on n-type silicon (Si) according to various embodiments.
Figure 4B:
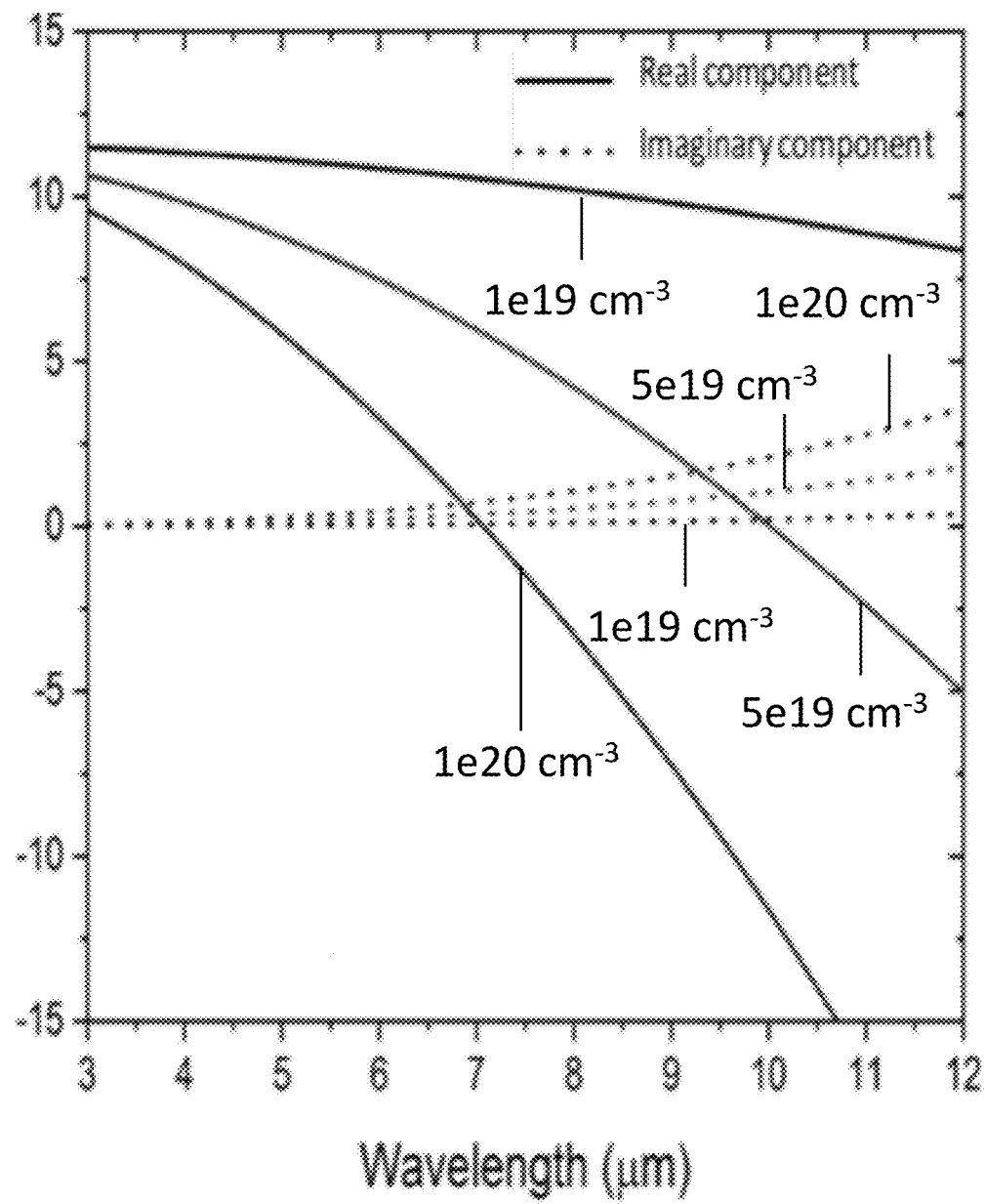
FIG. 4B is a plot of permittivity as a function of wavelength (in micrometers or μm) showing the effect of doping concentration has on p-type silicon (Si) according to various embodiments.

The dielectric constant of doped silicon can be examined by using the Lorentz-Drude Model. FIG. 4A is a plot of permittivity as a function of wavelength (in micrometers or µm) showing the effect of doping concentration has on n-type silicon (Si) according to various embodiments. FIG. 4B is a plot of permittivity as a function of wavelength (in micrometers or µm) showing the effect of doping concentration has on p-type silicon (Si) according to various embodiments. As the doping concentration increases, the real component of both n-type Si and p-type Si may switch to negative values at shorter wavelengths while the imaginary component may increase. This indicates that the absorption spectra of the absorber may peak at a shorter wavelength as doping concentration increases. By choosing an appropriate doping concentration, the absorber may be designed for various wavelengths. From the simulation, the workable doping concentration may be selected from a range of $1e^{19}$ cm$^{-3}$ to $5e^{19}$ cm$^{-3}$ (inclusive of both end values). In various embodiments, the semiconductor absorption structure 302, the semiconductor substrate 304, and/or the buried layer 306 may have a doping concentration selected from a range of $1e^{19}$ cm$^{-3}$ to $5e^{19}$ cm$^{-3}$ (inclusive of both end values).

Figure 4C:
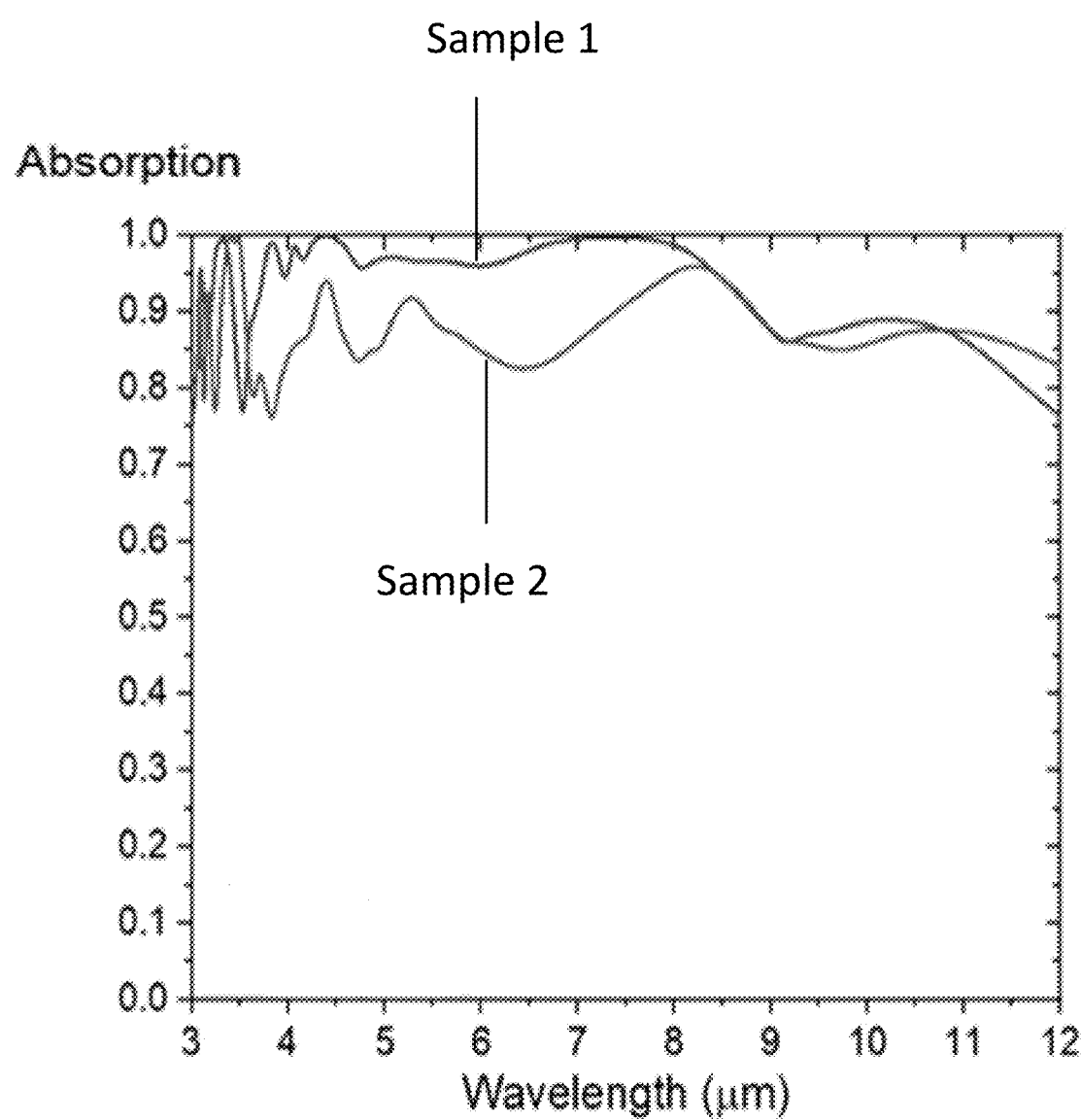
FIG. 4C is a plot of absorption as a function of wavelength (in micrometers or μm) showing the absorption spectra of two samples according to various embodiments.

FIG. 4C is a plot of absorption as a function of wavelength (in micrometers or µm) showing the absorption spectra of two samples according to various embodiments. In Sample 1, the semiconductor absorption structure 302 and the buried semiconductor structure 308 are n-type silicon (Si), while the semiconductor substrate 304 is p-type silicon (Si) as described above. The structure of Sample 2 is similar to that illustrated in FIG. 3, but polarities of the dopants are reverse, i.e. the semiconductor absorption structure 302 and the buried semiconductor structure 308 are p-type silicon (Si), while the semiconductor substrate 304 is n-type silicon (Si).

Figure 5:
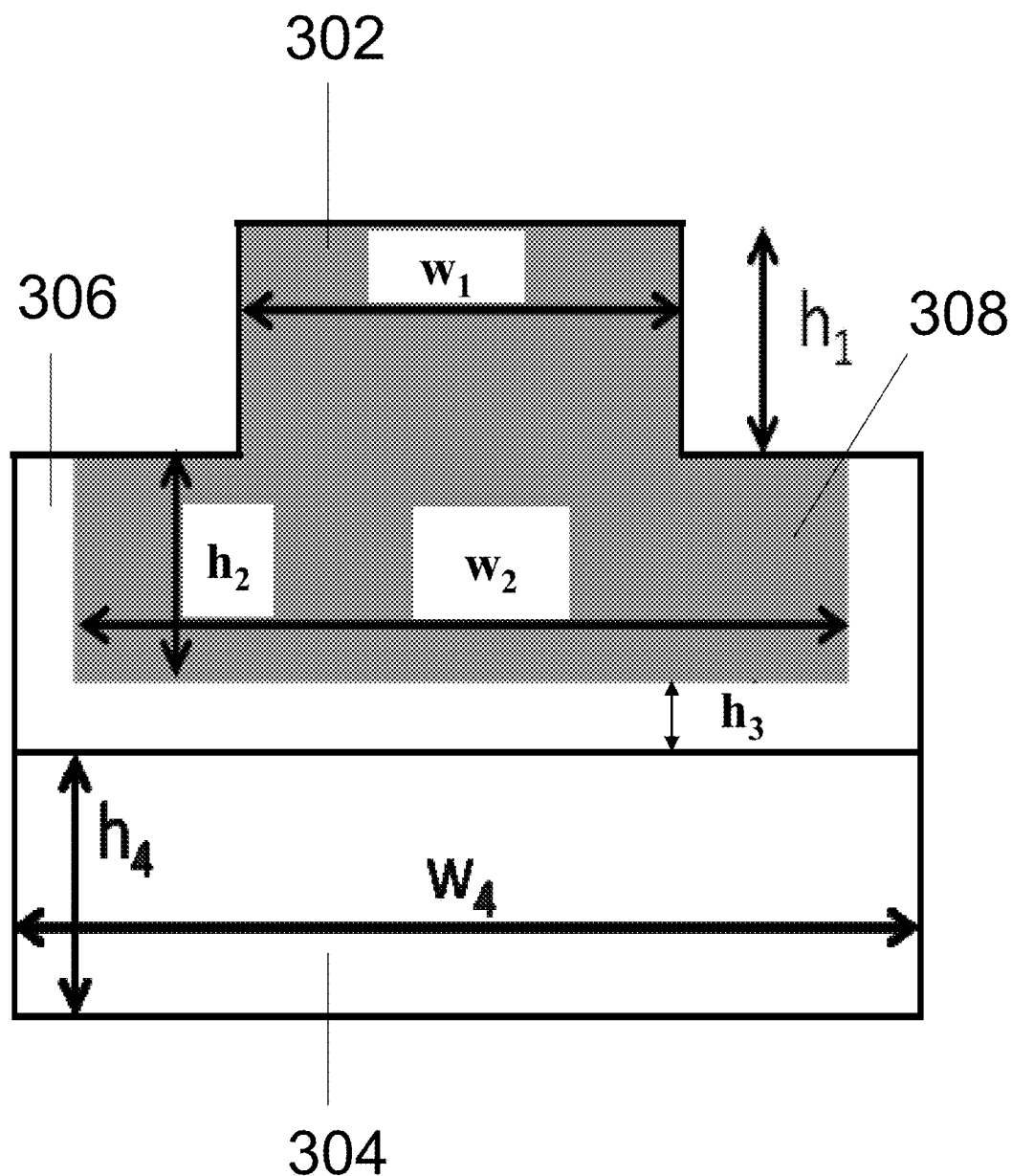
FIG. 5 is a schematic showing a cross-sectional view of the absorber shown in FIG. 3 according to various embodiments.

The performance of the absorber is explored using finite-difference time-domain method. FIG. 5 is a schematic showing a cross-sectional view of the absorber shown in FIG. 3 according to various embodiments. In this regard, the features in FIG. 5 have been labelled with the same reference numerals of the corresponding features in FIG. 3.

Figure 6:
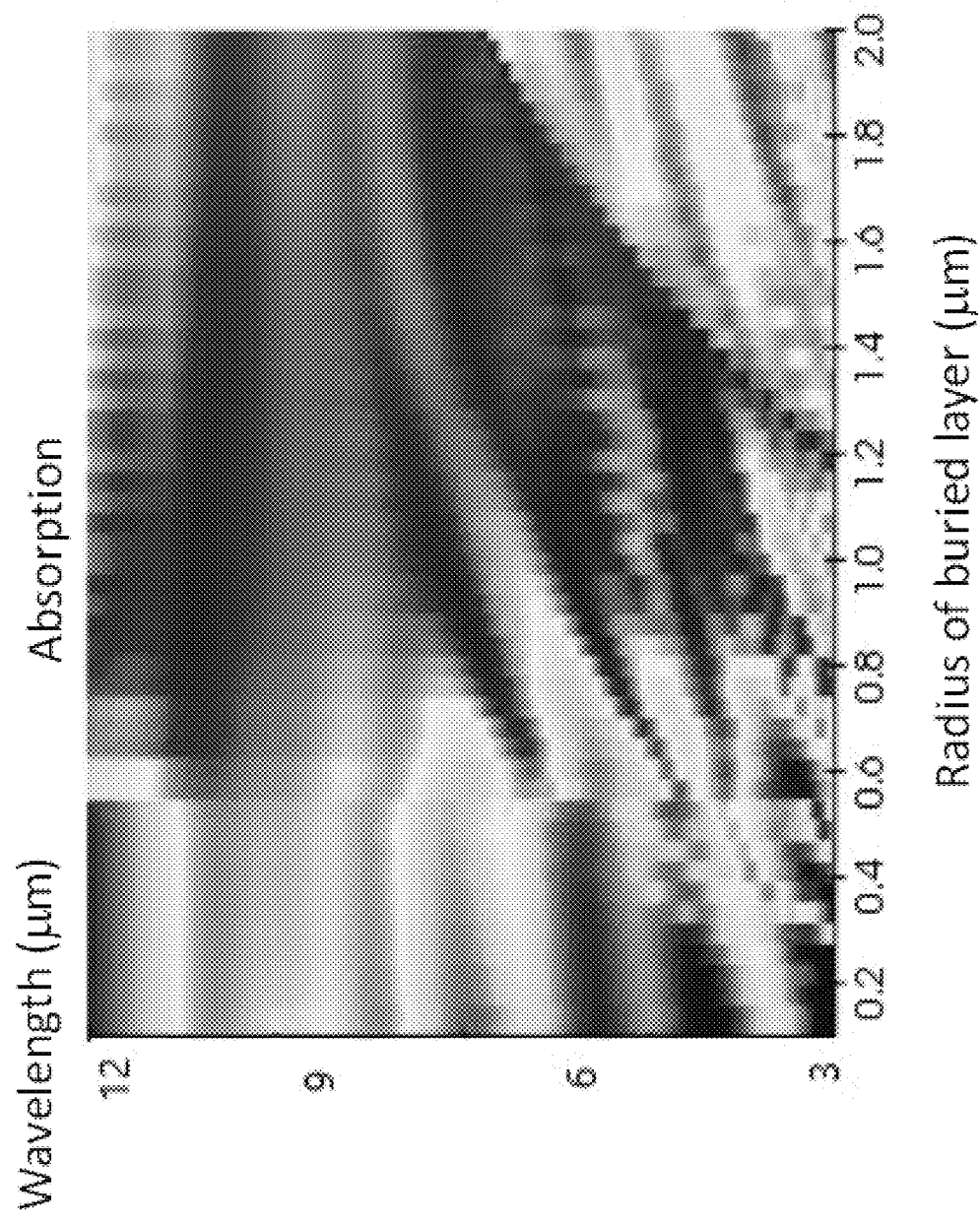
FIG. 6 is an absorption plot of wavelength (in micrometers or μm) as a function of the radius of the buried semiconductor structure showing the absorption of the absorber according to various embodiments across different wavelengths and radiuses.

The influence of the radius of the buried semiconductor structure $$308\left(\frac{w_2}{2}\right)$$

is examined. FIG. 6 is an absorption plot of wavelength (in micrometers or µm) as a function of the radius of the buried semiconductor structure 308 showing the absorption of the absorber according to various embodiments across different wavelengths and radiuses. The radius is swept from 0.2 µm to 2.0 µm. When the radius is increased from 0.2 µm to 1.2 µm, the bandwidth of high absorption increases and starts to narrow beyond 1.2 µm.

Figure 7:
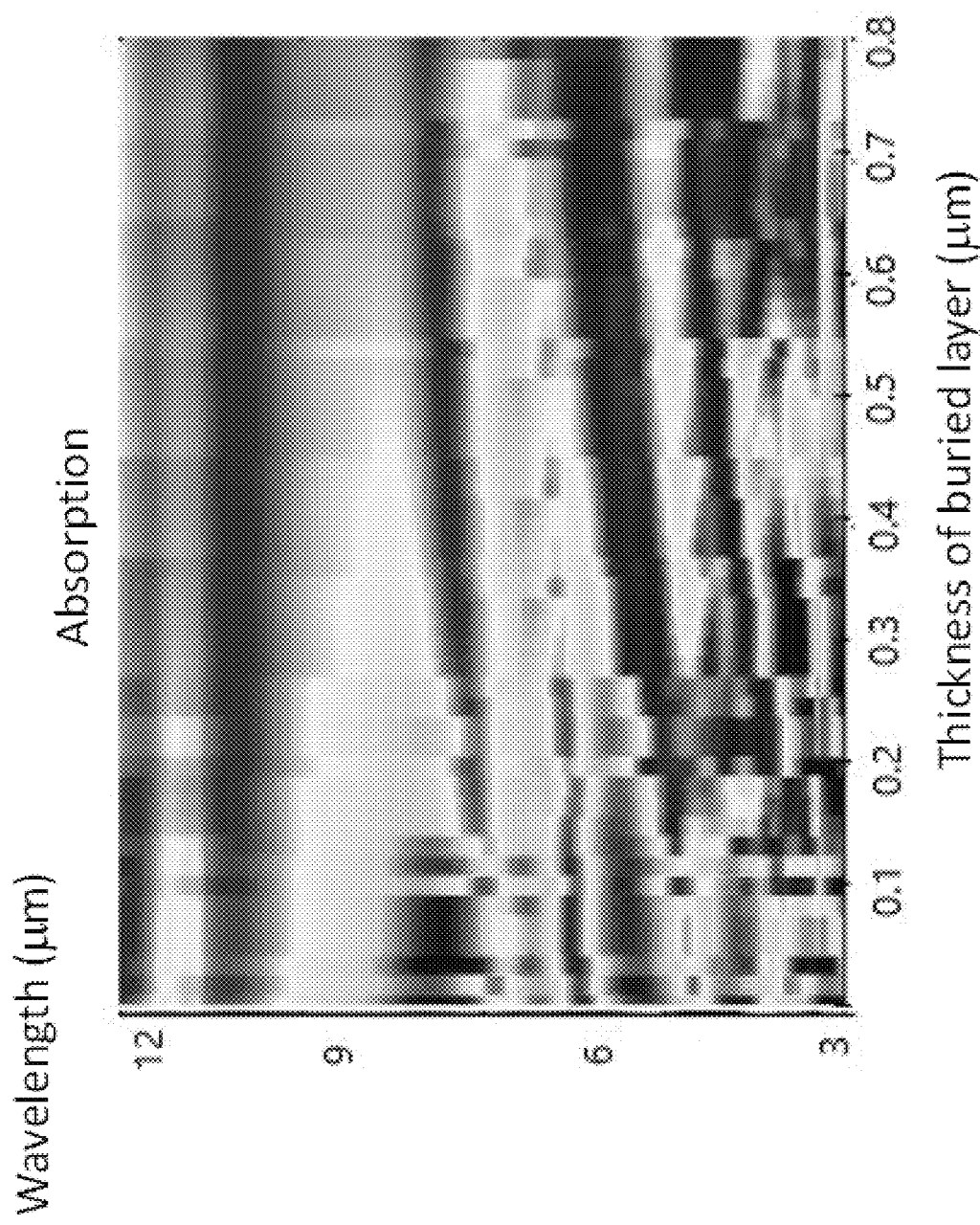
FIG. 7 is an absorption plot of wavelength (in micrometers or μm) as a function of the thickness of the buried semiconductor structure showing the absorption of the absorber according to various embodiments across different wavelengths and thicknesses.

The impact due to the variation of the thickness of the buried semiconductor structure 308 ($h_2$) is also investigated. FIG. 7 is an absorption plot of wavelength (in micrometers or µm) as a function of the thickness of the buried semiconductor structure 308 showing the absorption of the absorber according to various embodiments across different wavelengths and thicknesses. It can be seen from FIG. 7 that the absorption, especially in the shorter wavelengths, is significantly increased when the thickness is between 0.6 µm to 0.8 µm.

In various embodiments, the thickness of the buried semiconductor structure 308 ($h_2$) may be selected from a range of 0.6 µm to 0.8 µm (inclusive of both end values). In various embodiments, the radius of the buried semiconductor structure $$308\left(\frac{w_2}{2}\right)$$

may be selected from a range of 0.7 µm to 1.2 µm (inclusive of both end values).

Figure 8:
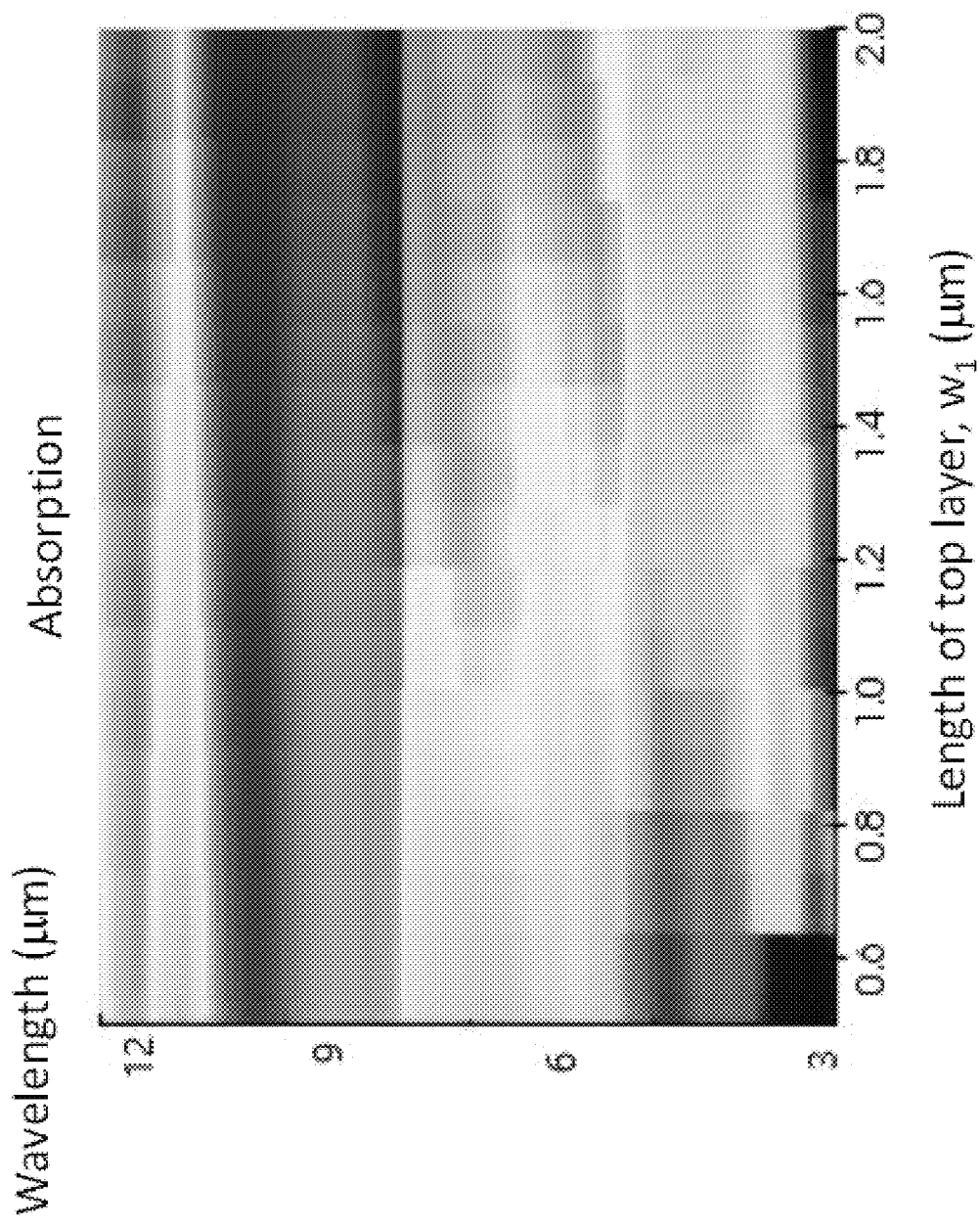
FIG. 8 is an absorption plot of wavelength (in micrometers or μm) as a function of the length of the semiconductor absorption structure ($w_1$) showing the absorption of the absorber according to various embodiments across different wavelengths and lengths.

The effect of changing the parameters on the top layer, $w_1$ and $h_1$, is examined next. FIG. 8 is an absorption plot of wavelength (in micrometers or µm) as a function of the length of the semiconductor absorption structure 302 ($w_1$) showing the absorption of the absorber according to various embodiments across different wavelengths and lengths. From FIG. 8, the increase in the length of the top layer, $w_1$ may increase the absorption at longer wavelengths.

Figure 9:
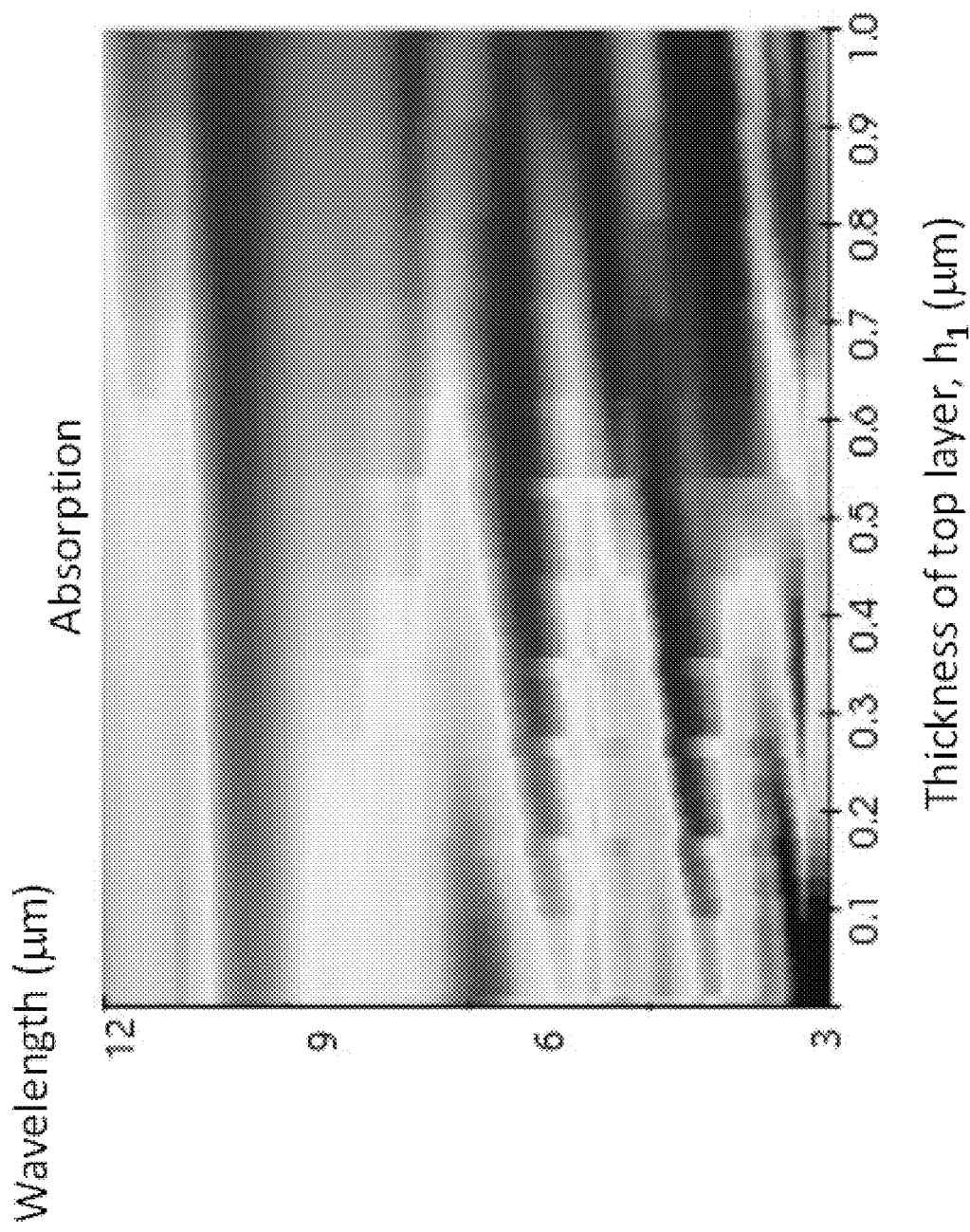
FIG. 9 is an absorption plot of wavelength (in micrometers or μm) as a function of the thickness of the semiconductor absorption structure ($h_1$) showing the absorption of the absorber according to various embodiments across different wavelengths and thicknesses.

FIG. 9 is an absorption plot of wavelength (in micrometers or µm) as a function of the thickness of the semiconductor absorption structure 302 ($h_1$) showing the absorption of the absorber according to various embodiments across different wavelengths and thicknesses. As shown in FIG. 9, the absorption bandwidth may widen and the intensity may peak in the region between 0.7 µm to 1.0 µm.

Figure 10:
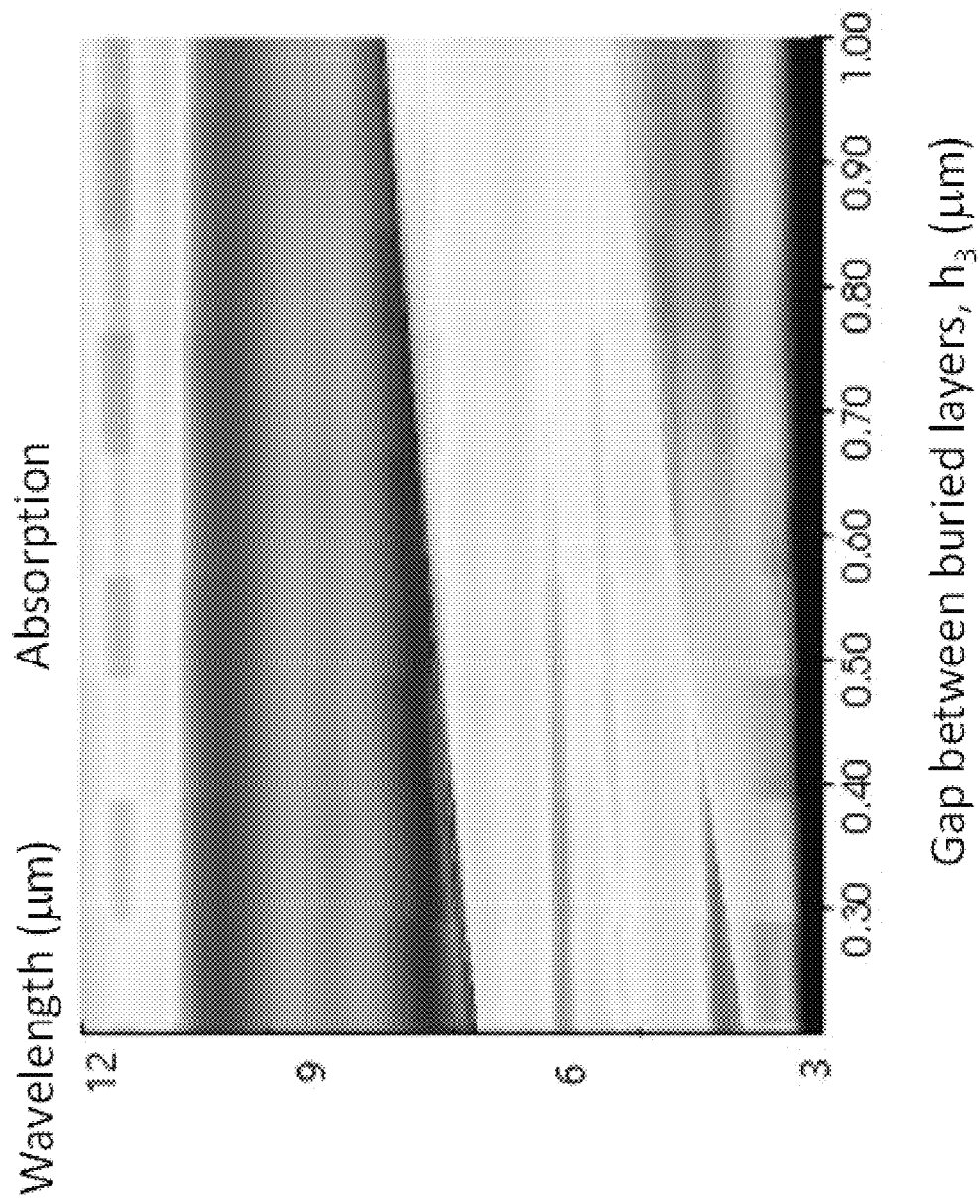
FIG. 10 is an absorption plot of wavelength (in micrometers or μm) as a function of the gap width ($h_3$) between the buried semiconductor structure and the semiconductor substrate showing the absorption of the absorber according to various embodiments across different wavelengths and gap widths.

FIG. 10 is an absorption plot of wavelength (in micrometers or µm) as a function of the gap width ($h_3$) between the buried semiconductor structure 308 and the semiconductor substrate 304 showing the absorption of the absorber according to various embodiments across different wavelengths and gap widths. As the gap decreases, there may be an increase in both absorption intensity and bandwidth across the entire spectrum. In various embodiments, the gap width ($h_3$) between the buried semiconductor structure 308 and the semiconductor substrate 304 may be selected from a range of 0.2 µm to 0.3 µm (inclusive of both end values).

Figure 11A:
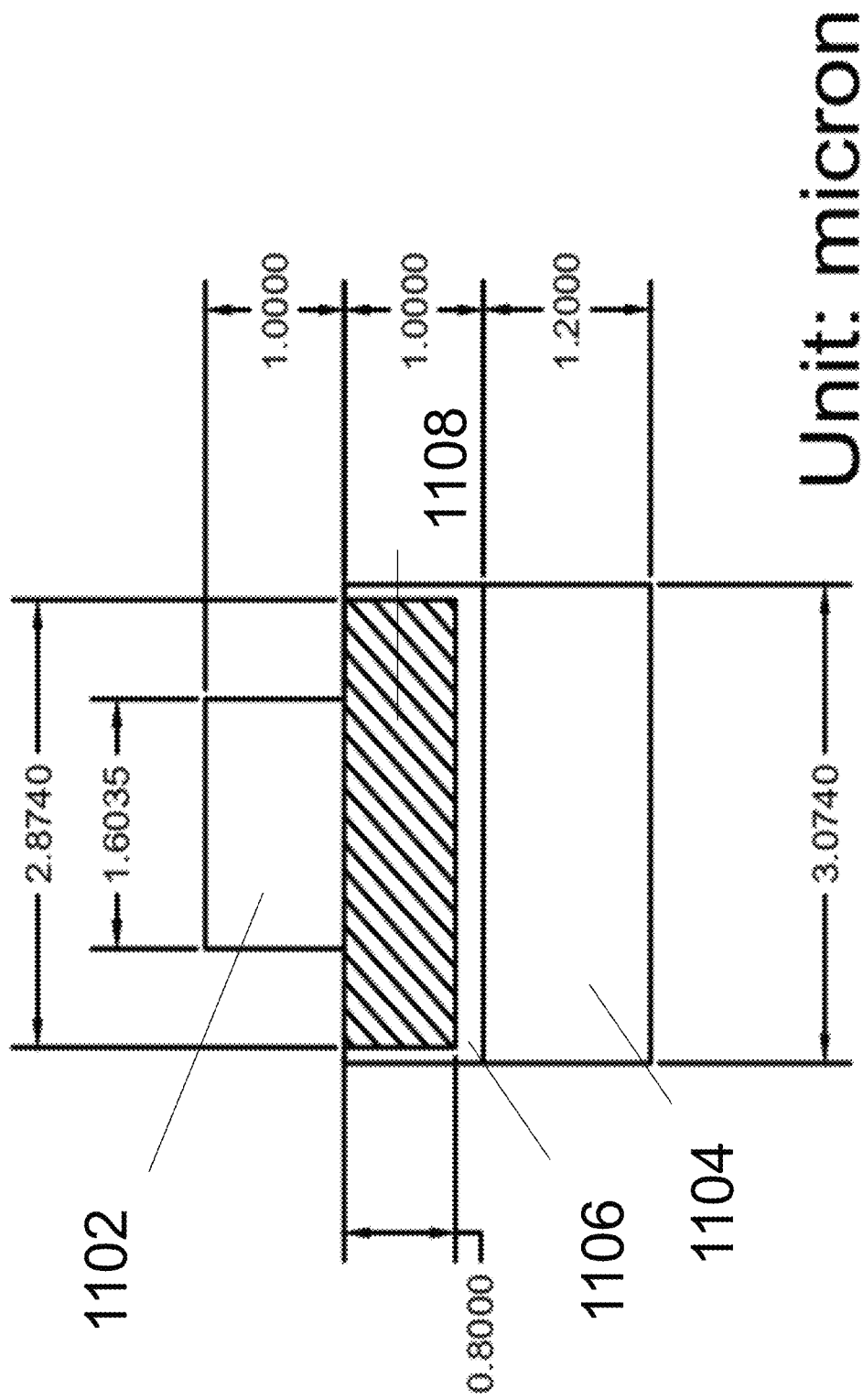
FIG. 11A is a schematic showing a front view of the absorber according to various embodiments.
Figure 11B:
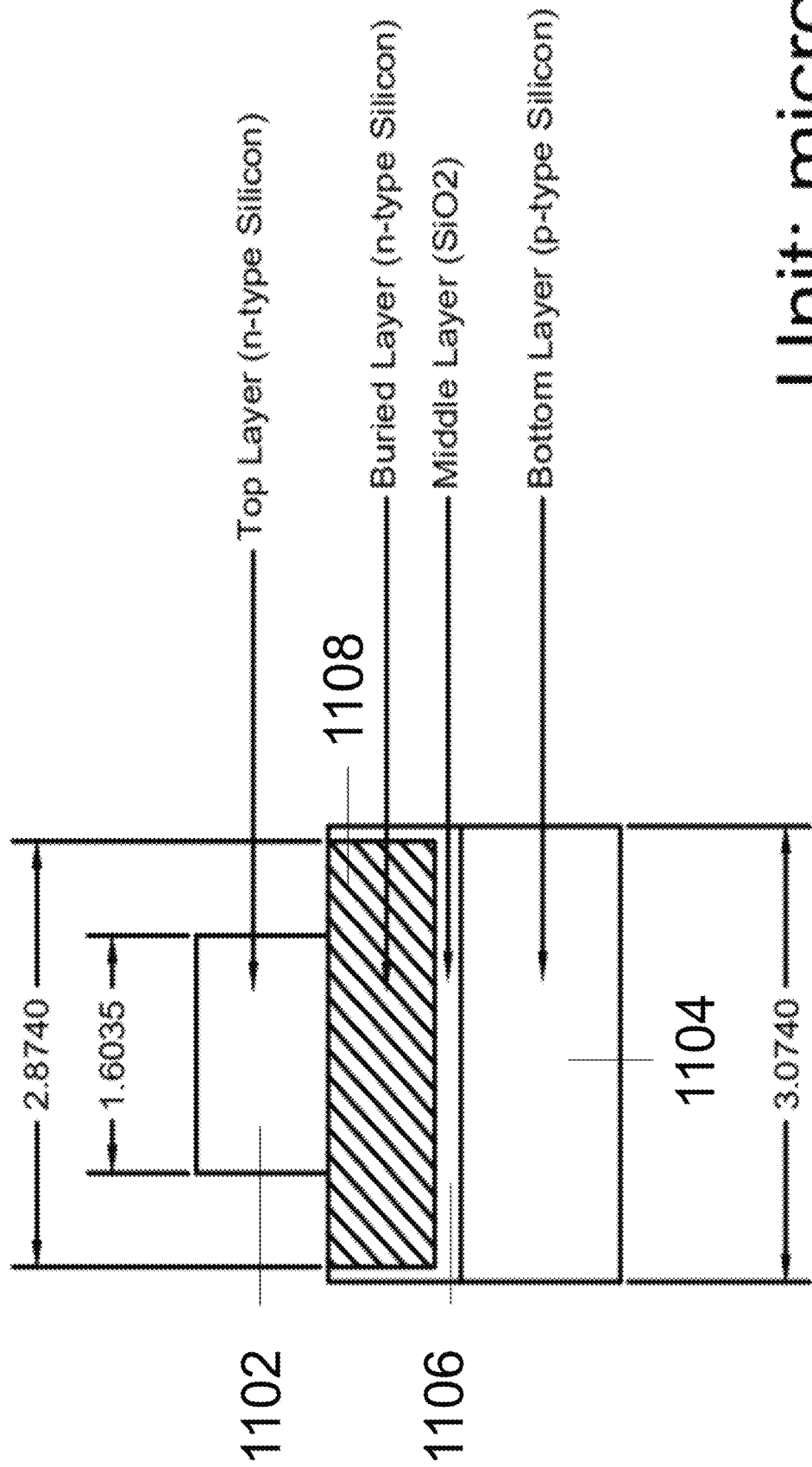
FIG. 11B is a schematic showing a side view of the absorber shown in FIG. 11A according to various embodiments.

FIGS. 11A-C show three view of the basic unit according to various embodiments. FIG. 11A is a schematic showing a front view of the absorber according to various embodiments. FIG. 11B is a schematic showing a side view of the absorber shown in FIG. 11A according to various embodiments. FIG. 11C is a schematic showing a top view of the absorber shown in FIG. 11A according to various embodiments.

The structure of the top layer, i.e. semiconductor absorption structure 1102, may be a cuboid with a length and width of 1.6035 µm and a height of 1 µm. The material of the top layer 1102 may be n-type silicon (Si) with a doping concentration $5.2 \times 10^{19}$ cm$^{-3}$. Beneath this top layer 1102, the buried layer, i.e. buried semiconductor structure 1108, may be a cylinder embedded in the middle layer, i.e. dielectric layer 1106, with a height of 0.8 µm and a diameter of 2.874

µm. The material of the buried layer 1108 may be the same as that of the top layer 1102. This buried layer 1108 may be embedded in the cuboid $SiO_2$ middle layer 1160, which has a length and width of 3.074 µm and a height of 1 µm. Finally, the bottom layer, i.e. semiconductor substrate 1104, may be a cuboid with a length and a width of 3.074 µm and a height of 1.2 µm. The material of the bottom layer 1104 may be p-type silicon (Si) of doping concentration $5.5 \times 10^{19}$ $cm^{-3}$.

Figure 12:
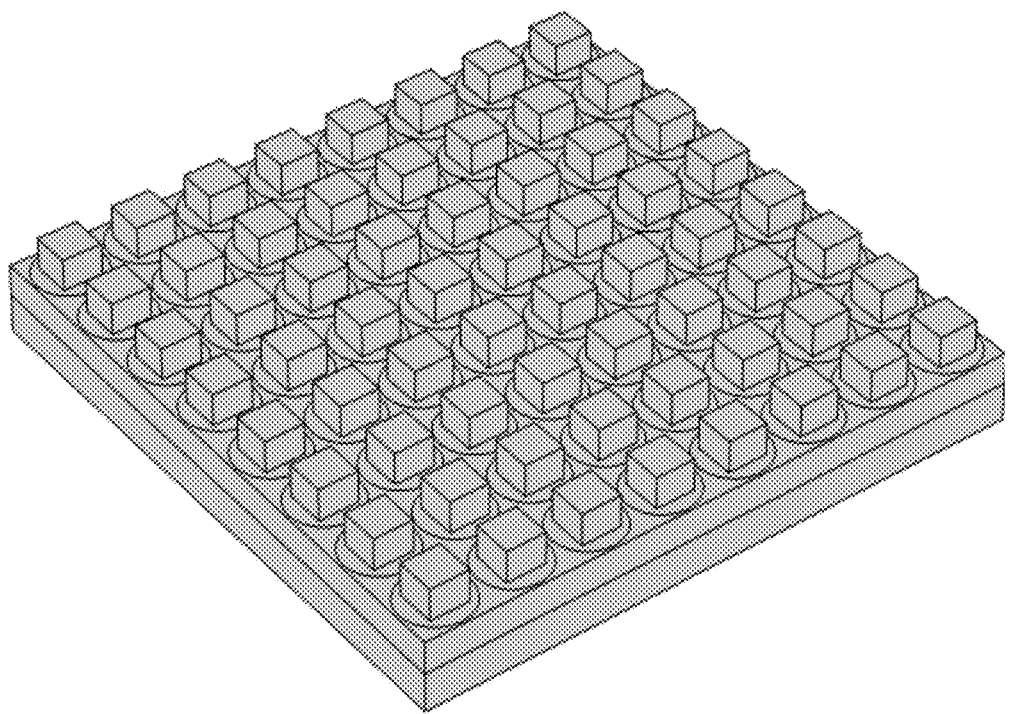
FIG. 12 is a schematic showing an array of absorbers according to various embodiments.

FIG. 12 is a schematic showing an array of absorbers according to various embodiments. The array may include a plurality of absorbers (unit cells), such as the absorber (unit cell) shown in FIG. 3 or FIGS. 11A-C. The plurality of absorbers (unit cells) may be arranged in a periodic array.

Figure 13:
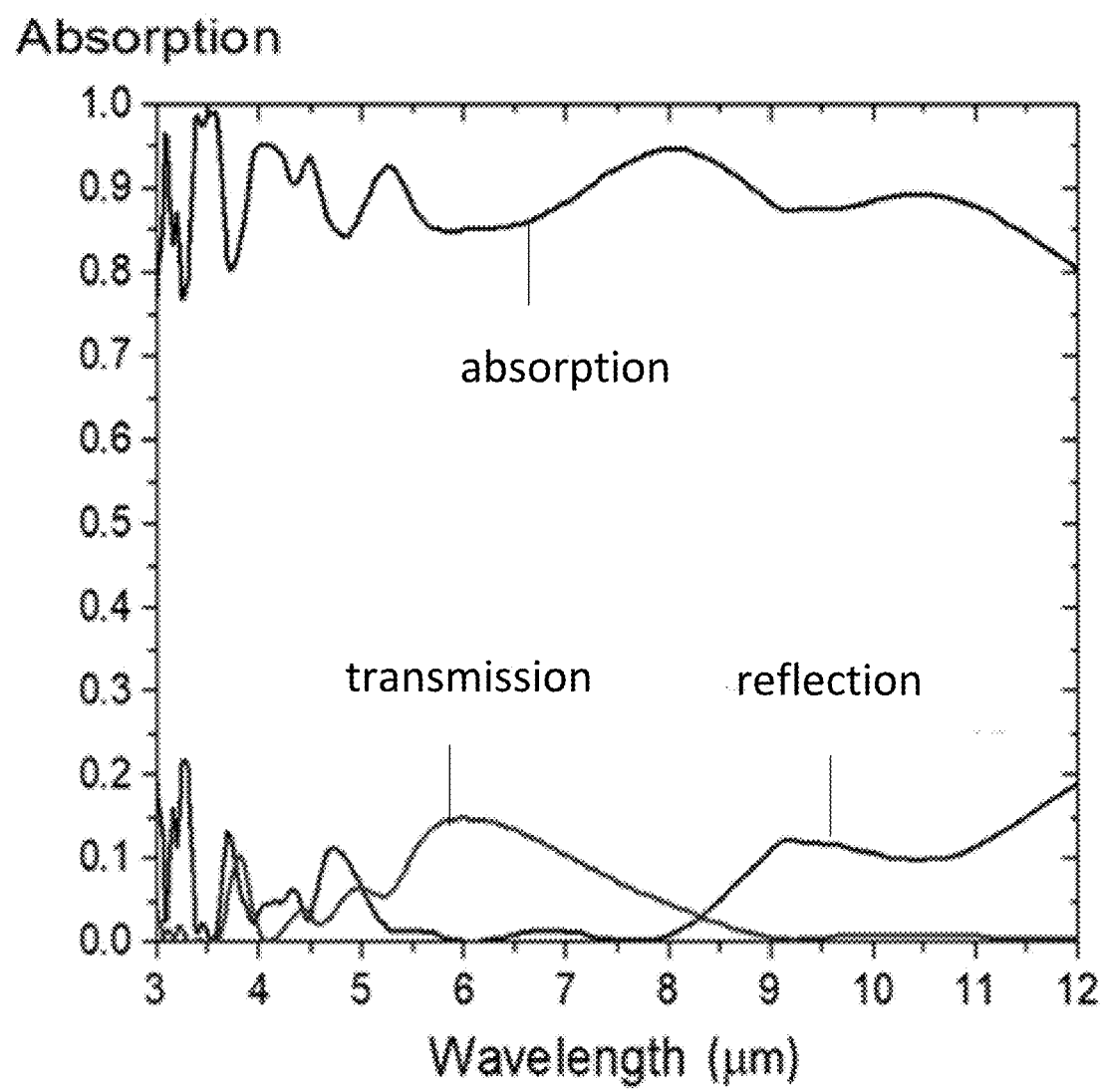
FIG. 13 is a plot of magnitude as a function of wavelength (in micrometers or μm) showing the reflection, transmission and absorption spectra of the absorber according to various embodiments.

FIG. 13 is a plot of magnitude as a function of wavelength (in micrometers or µm) showing the reflection, transmission and absorption spectra of the absorber according to various embodiments.

As shown by FIG. 13, various embodiments may significantly improve the absorption of metamaterial absorbers to more than 80% of the incident light in an ultra-wide bandwidth that is from 3 µm to 12 µm.

Figure 14:
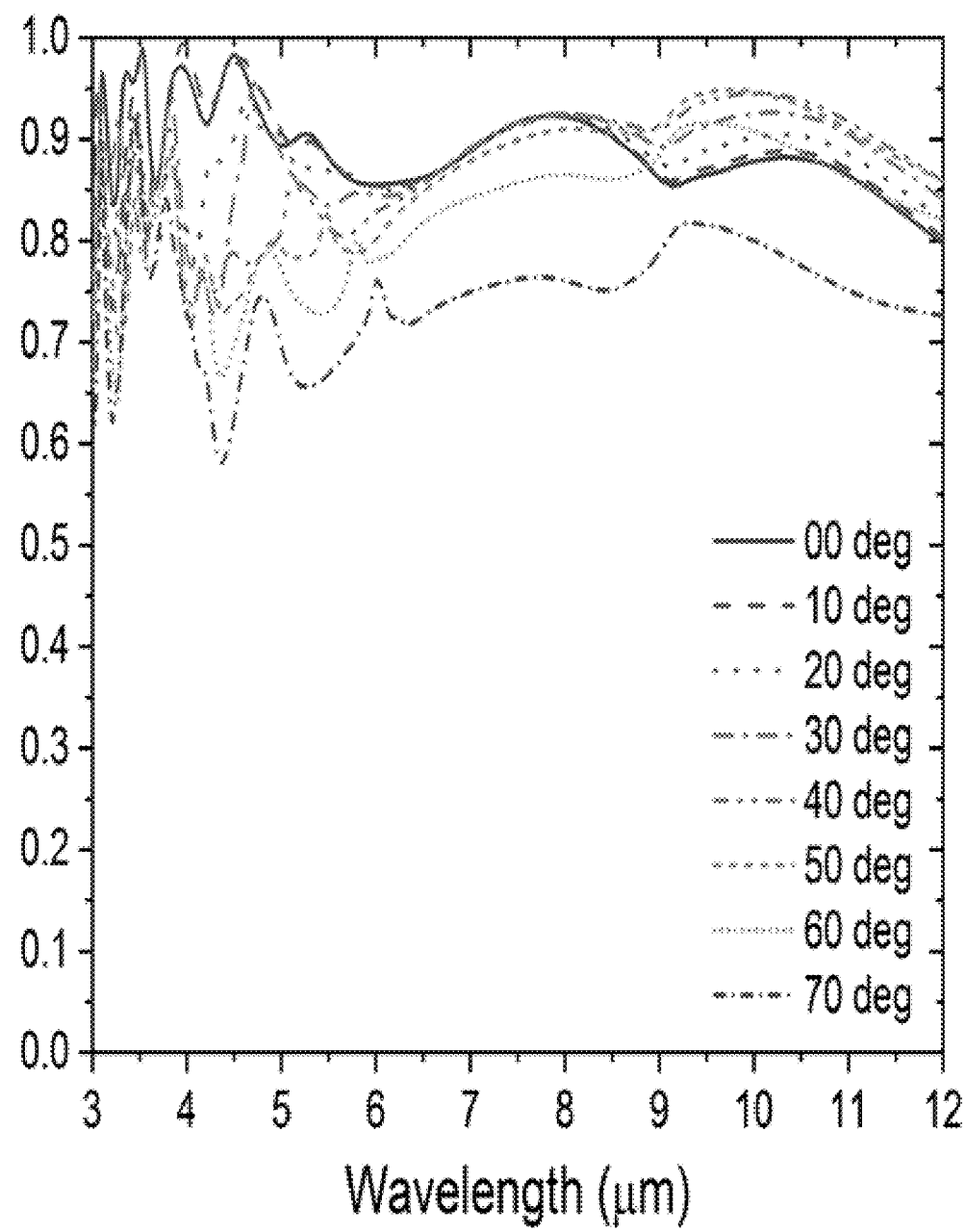
FIG. 14 is a plot of absorption as a function of wavelength (in micrometers or μm) showing the absorption spectra of light incident onto the absorber according to various embodiments at different incident angles.

FIG. 14 is a plot of absorption as a function of wavelength (in micrometers or µm) showing the absorption spectra of light incident onto the absorber according to various embodiments at different incident angles.

The performance of the absorber may not be sensitive to the incident angle. Even when the incident angle is up to 70 degrees, there may still be more than 60% absorption in the whole bandwidth. This may be attributed to the presence of gap plasmons as shown in FIGS. 15A-D.

Figure 15A:
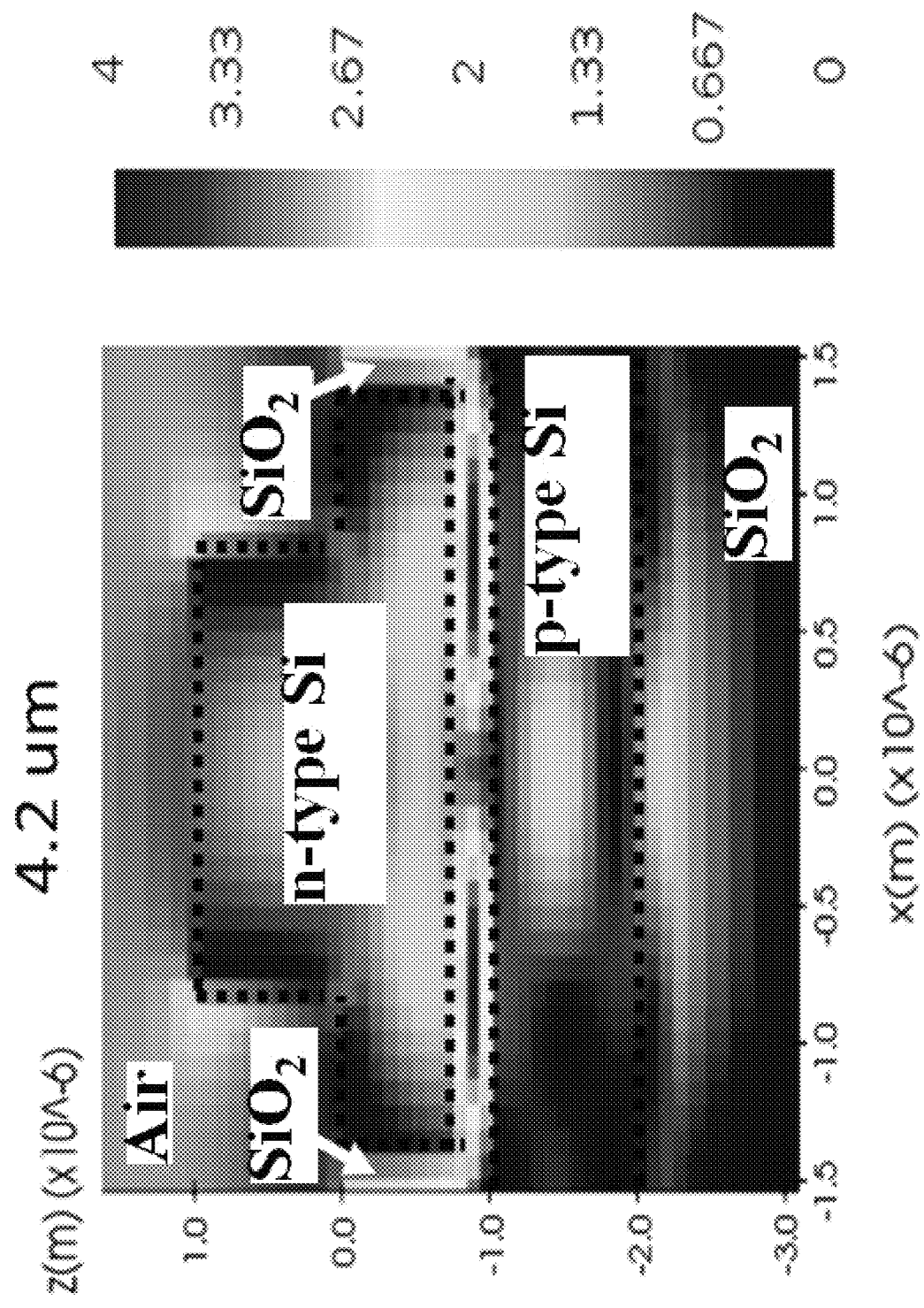
FIG. 15A is a plot of z dimension (in meters or m) as a function of x dimension (in meters or m) showing the absorption of light of wavelength 4.2 μm by the absorber according to various embodiments.
Figure 15B:
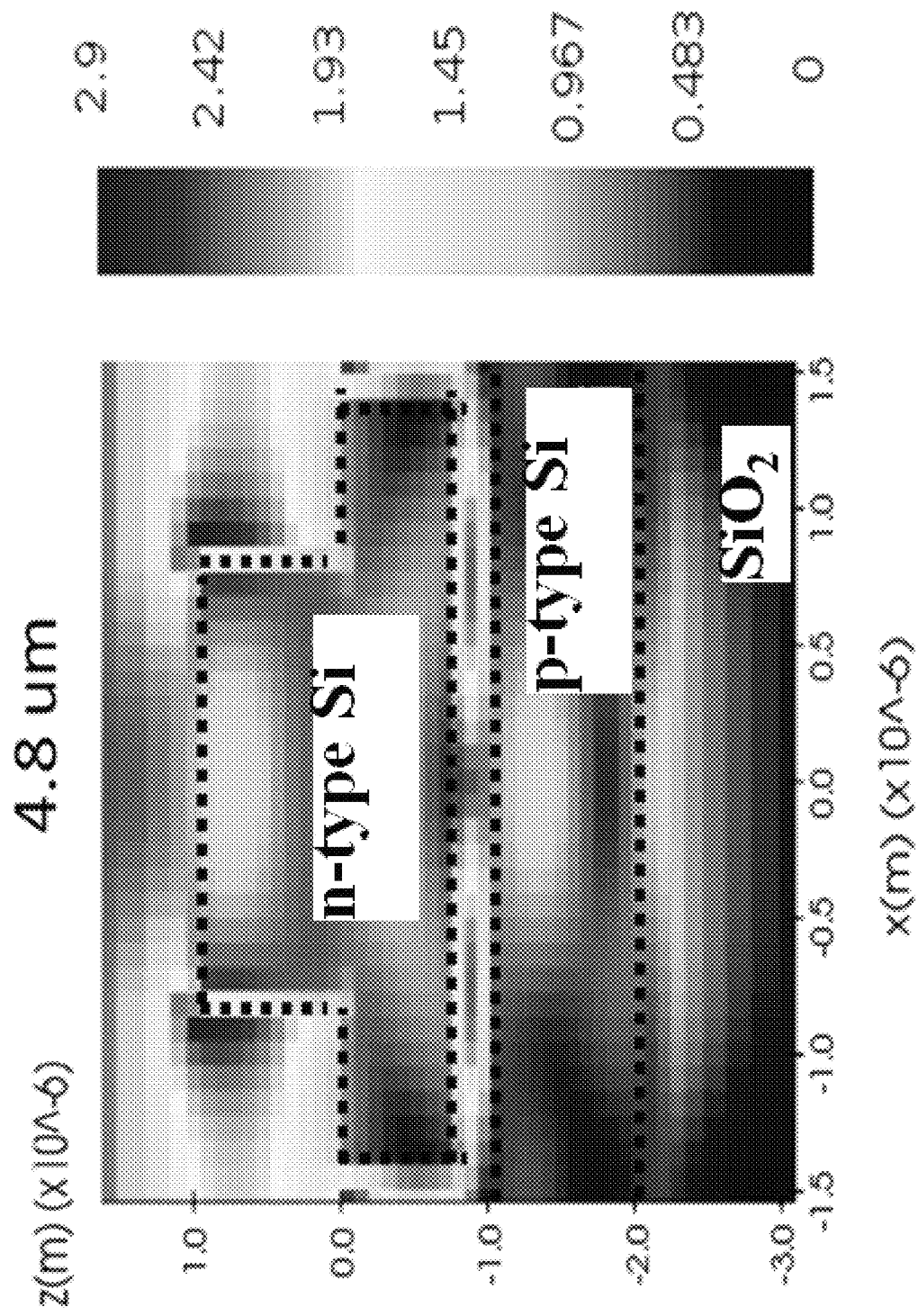
FIG. 15B is a plot of z dimension (in meters or m) as a function of x dimension (in meters or m) showing the absorption of light of wavelength 4.8 μm by the absorber according to various embodiments.
Figure 15C:
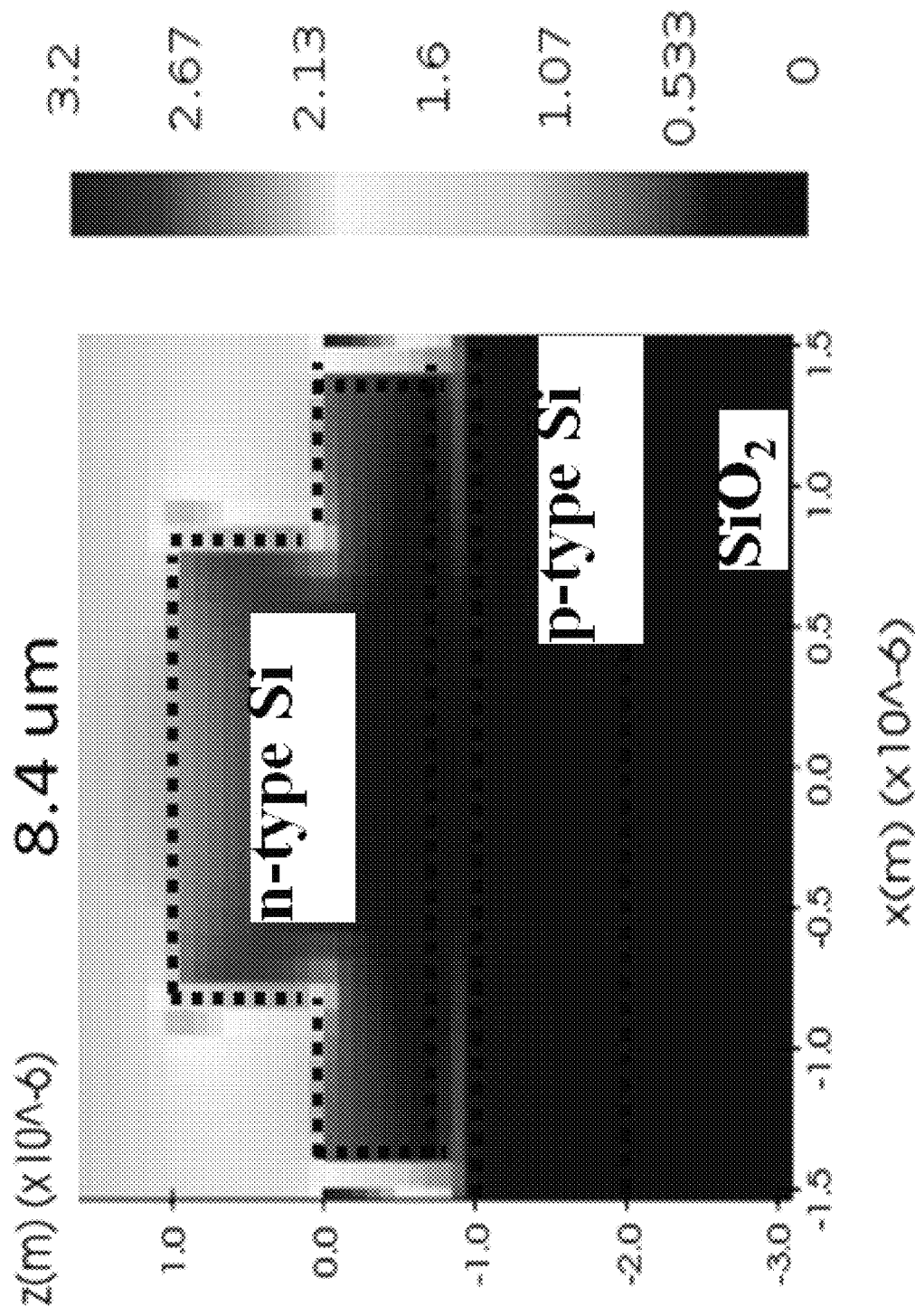
FIG. 15C is a plot of z dimension (in meters or m) as a function of x dimension (in meters or m) showing the absorption of light of wavelength 8.4 μm by the absorber according to various embodiments.
Figure 15D:
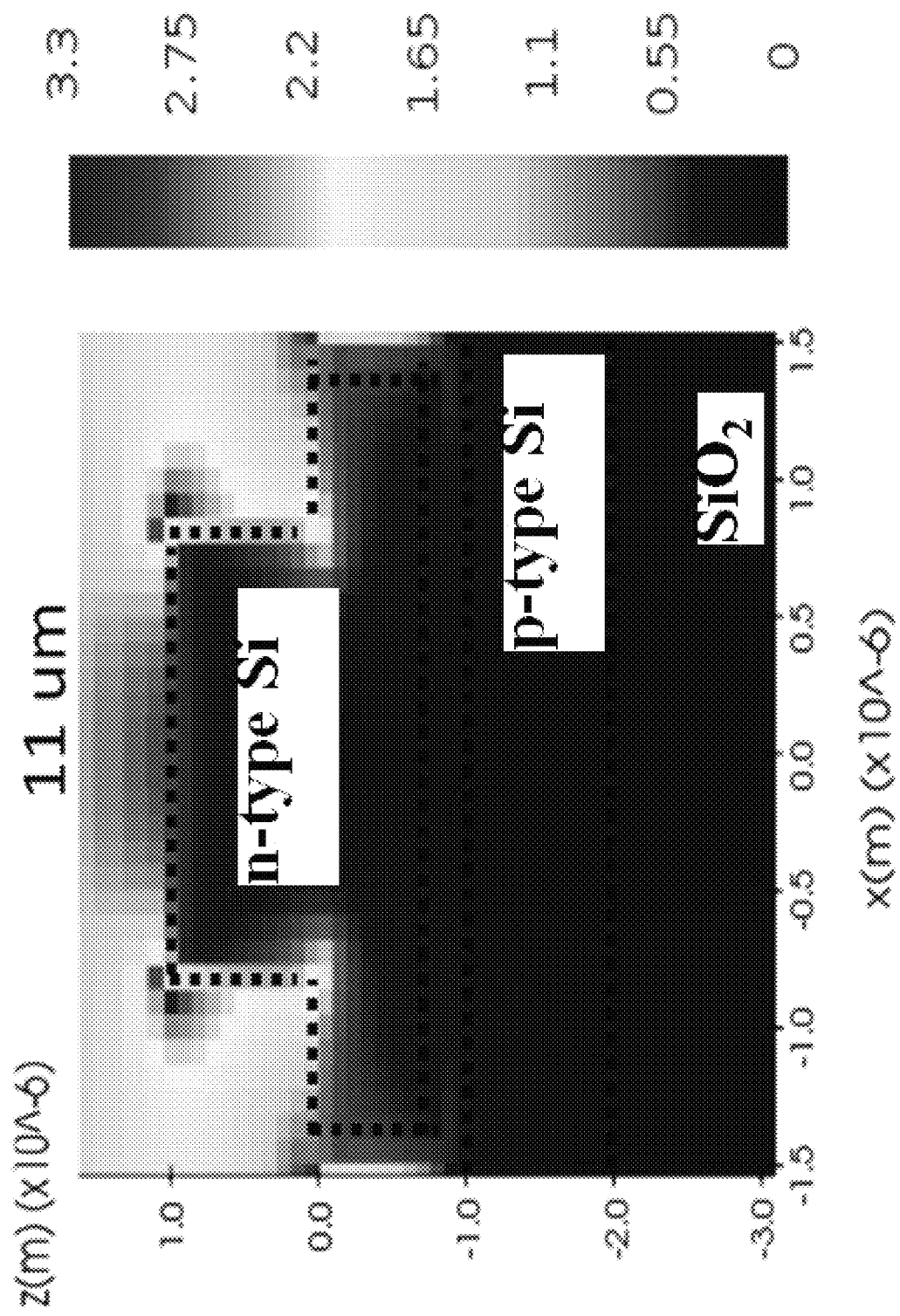
FIG. 15D is a plot of z dimension (in meters or m) as a function of x dimension (in meters or m) showing the absorption of light of wavelength 11 μm by the absorber according to various embodiments.

FIG. 15A is a plot of z dimension (in meters or m) as a function of x dimension (in meters or m) showing the absorption of light of wavelength 4.2 µm by the absorber according to various embodiments. FIG. 15B is a plot of z dimension (in meters or m) as a function of x dimension (in meters or m) showing the absorption of light of wavelength 4.8 µm by the absorber according to various embodiments. FIG. 15C is a plot of z dimension (in meters or m) as a function of x dimension (in meters or m) showing the absorption of light of wavelength 8.4 µm by the absorber according to various embodiments. FIG. 15D is a plot of z dimension (in meters or m) as a function of x dimension (in meters or m) showing the absorption of light of wavelength 11 µm by the absorber according to various embodiments.

At shorter wavelengths such as 4.2 µm and 4.8 µm, the electric field may be concentrated in the $SiO_2$ layer. These gap plasmon modes excited may make the high absorption insensitive to the angle of incidence. At longer wavelengths such as 9.4 µm and 11.0 µm, the electric field may be concentrated around the edges. These may be due to the high attenuation coefficient of the doped silicon at its plasma wavelength ($\lambda_{n\text{-}type}$=8.3 µm and $\lambda_{p\text{-}type}$=9.5 µm). Such absorption may be insensitive to incident angle as well, hence contributing to the wide angle absorption of the absorber.

Various embodiments may relate to a mid-infrared absorber, e.g. a nanostructured plasmonic absorber. Various embodiments may involve the use of doped Si as the material for the absorber.

Various embodiments may realize broadband and broad-angle absorption despite using a simple structure design.

The usage of a cuboid doped Si on top of a buried circular doped Si design may allow for broadband absorption of more than 80% from 3.0 µm to 12.0 µm. The usage of a cuboid doped Si on top of a buried circular doped Si design may allow the two layers to have a combined high absorption across a very broad wavelength range from 3.0 µm to 12.0 µm. The two shapes used in the absorber may complement each layer's performance to produce a high overall absorption. For example, a cuboid doped Si on top of a buried cuboid doped Si or circular doped Si on top of a buried circular doped Si design may not work as well.

At the same time, the high performance of the absorber may also surprisingly be maintained from 0 to 70 degrees angle of incidence. Various embodiments may allow for broadband absorption of more than 80% from 3.0 µm to 12.0 µm up to 70 degrees angle of incidence.

The use of both highly n-doped and p-doped silicon allows the production of surface plasmons for more than 80% absorption up to 70 degrees angle of incidence.

Various embodiments may be integrated into multiple sensor technologies such as pyrodetectors, thermopiles, bolometers etc. for sensing in the mid-infrared wavelengths.

Various embodiments may require a less complicated fabrication process and may only use complementary metal oxide semiconductor (CMOS)-compatible materials. Various embodiments may also have a high yield. Various embodiments may require a less complicated process compared to fabrication for a multi-layer stack, even though additional masks may be required to pattern the top and buried layers.

The broadband and broad-angle absorption in the mid-infrared wavelengths may allow for better performing thermal sensors. When used on top of technologies such as pyrodetectors, it may allow the possibility of implementing imaging applications including spectral, multispectral, hyperspectral and thermal.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. An absorber comprising:
   a semiconductor absorption structure doped with dopants of a first conductivity type;
   a semiconductor substrate doped with dopants of a second conductivity type different from the first conductivity type;
   a dielectric layer between the semiconductor absorption structure and the semiconductor substrate; and
   a buried semiconductor structure comprised in a cavity of the dielectric layer, the buried semiconductor structure doped with dopants of the first conductivity type.

2. The absorber according to claim 1, wherein the buried semiconductor structure extends from the semiconductor absorption structure.

3. The absorber according to claim 1, wherein the first conductivity type is n-type and the second conductivity type is p-type.

4. The absorber according to claim 1, wherein the semiconductor absorption structure, the semiconductor substrate, and the buried semiconductor structure comprise silicon; and wherein the dielectric layer comprises silicon oxide.

5. The absorber according to claim 1, wherein the semiconductor absorption structure is a cuboid.

6. The absorber according to claim 1, wherein the buried semiconductor structure is a cylinder having a circular surface at one end.

7. The absorber according to claim 6, wherein the circular surface has a radius selected from a range from 0.7 µm to 1.2 µm.

8. The absorber according to claim 6, wherein a thickness of the cylinder is selected from a range from 0.6 µm to 0.8 µm.

9. The absorber according to claim 1, wherein the semiconductor absorption structure is patterned.

10. The absorber according to claim 1, wherein the semiconductor absorption structure has a doping concentration selected from a range from $10^{19}$ cm$^{-3}$ to $5\times10^{19}$ cm$^{-3}$.

11. A method of forming an absorber, the method comprising:
    forming a semiconductor absorption structure doped with dopants of a first conductivity type;
    forming a semiconductor substrate doped with dopants of a second conductivity type different from the first conductivity type;
    forming a dielectric layer between the semiconductor absorption structure and the semiconductor substrate; and
    forming a buried semiconductor structure comprised in a cavity of the dielectric layer, the buried semiconductor structure doped with dopants of the first conductivity type.

12. The method according to claim 11, wherein the buried semiconductor structure extends from the semiconductor absorption structure.

13. The method according to claim 11, wherein the first conductivity type is n-type and the second conductivity type is p-type.

14. The method according to claim 11, wherein the semiconductor absorption structure, the semiconductor substrate, and the buried semiconductor structure comprise silicon; and wherein the dielectric layer comprises silicon oxide.

15. The method according to claim 11, wherein the semiconductor absorption structure is a cuboid.

16. The method according to claim 11, wherein the buried semiconductor structure is a cylinder having a circular surface at one end.

17. The method according to claim 16, wherein the circular surface has a radius selected from a range from 0.7 µm to 1.2 µm.

18. The method according to claim 16, wherein a thickness of the cylinder is selected from a range from 0.6 µm to 0.8 µm.

19. The method according to claim 11, wherein the semiconductor absorption structure is patterned.

20. The method according to claim 11, wherein the semiconductor absorption structure has a doping concentration selected from a range from $10^{19}$ cm$^{-3}$ to $5\times10^{19}$ cm$^{-3}$.

* * * * *